(12) United States Patent
Sawabe et al.

(10) Patent No.: US 7,443,517 B2
(45) Date of Patent: Oct. 28, 2008

(54) MEASURING INSTRUMENT AND LASER BEAM MACHINE FOR WAFER

(75) Inventors: Taiki Sawabe, Ota-ku (JP); Keiji Nomaru, Ota-ku (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 12/002,038

(22) Filed: Dec. 14, 2007

(65) Prior Publication Data
US 2008/0180697 A1   Jul. 31, 2008

(30) Foreign Application Priority Data
Dec. 20, 2006   (JP) .............................. 2006-343185

(51) Int. Cl.
*G01B 11/28*   (2006.01)
(52) U.S. Cl. .................................. 356/630; 250/559.27
(58) Field of Classification Search ................. 356/630, 356/625; 250/559.27
See application file for complete search history.

(56) References Cited

U.S. PATENT DOCUMENTS

2006/0076327 A1* 4/2006 Kobayashi et al. ..... 219/121.73

2007/0243696 A1* 10/2007 Kobayashi et al. .......... 438/463

FOREIGN PATENT DOCUMENTS

| JP | 2002-192370 | 7/2002 |
|----|-------------|--------|
| JP | 2003-163323 | 6/2003 |
| JP | 2006-247674 | 9/2006 |

* cited by examiner

*Primary Examiner*—Roy M Punnoose
(74) *Attorney, Agent, or Firm*—Greer, Burns & Crain, Ltd.

(57) ABSTRACT

A measuring instrument for a wafer for measuring the thickness of a wafer held on a chuck table using a laser beam includes a condenser for condensing and irradiating the laser beam on the wafer held on the chuck table, a light reception unit for receiving reflected light of the laser beam irradiated upon the wafer, a convergence light point changing unit for changing the convergence light point of the laser beam, and a control unit for measuring the thickness of the wafer based on a change signal from the convergence light point changing unit and a light reception signal from the light reception unit. The control unit stores a thickness control map. The control unit controls an angle adjustment actuator, provided for adjusting the installation angle of a pair of mirrors, to change the installation angle and detects two peaks of the light amount based on the reception signal from the light reception unit.

10 Claims, 16 Drawing Sheets

MEASURING INSTRUMENT AND LASER BEAM MACHINE FOR WAFER

BACKGROUND OF THE INVENTION

1. Field of the Invention

This invention relates to a measuring instrument for measuring the thickness or the height of an upper face of a wafer such as a semiconductor wafer held on a chuck table equipped on a processing machine for a wafer such as a laser beam machine or laser processing machine.

2. Description of the Related Art

In a semiconductor device fabrication process, a plurality of regions are partitioned by scheduled division lines called streets disposed in grating-like arrangement on the surface of a semiconductor wafer having a substantially disk shape, and such a device as an IC or an LSI is formed in each of the partitioned regions. Then, the semiconductor wafer is cut along the streets to cut the regions in which the devices are formed to divide individual semiconductor chips.

In order to achieve down-scaling and enhancement in function of an apparatus, a module structure wherein a plurality of semiconductor chips are laminated and electrodes of the laminated semiconductor chips are connected has been put into practical use. The module structure is configured such that, at a position on the surface of a semiconductor wafer at which an electrode called bonding pad is formed, a hole (via hole) is formed from the rear face such it extends to the bonding pad, and a conductive material such as aluminum is filled in the via hole such that it connects to the bonding bad (refer, for example, to Japanese Patent Laid-Open No. 2003-163323). The via hole provided in the semiconductor wafer described above is formed using a drill. However, the via hole formed in the semiconductor wafer is as small as 100 to 300 μm in diameter, and perforation by drilling has a problem that the productivity is low.

In order to eliminate the problem described above, a laser beam machine has been proposed which includes machining feed amount detection means for detecting a relative machining feed amount between a chuck table for holding a workpiece and laser beam irradiation means, storage means for storing X and Y coordinate values of fine holes to be formed in the workpiece, and control means for controlling the laser beam irradiation means based on the X and Y coordinate values of the fine holes stored in the storage means and a detection signal from the machining feed amount detection means, a laser beam being irradiated when the X and Y coordinate values of a fine hole to be formed in the workpiece reach a position just below a condenser of the laser beam irradiation means (refer, for example, to Japanese Patent Laid-Open No. 2006-247674).

Meanwhile, as a method of dividing a semiconductor wafer or the like described above along a street, also a laser machining method has been attempted wherein a pulse laser beam of a wavelength having permeability in a wafer is used and irradiated with the convergence light point thereof adjusted to the inside of a region to be divided. A dividing method which uses the laser machining method includes the steps of irradiating a pulse laser beam of an infrared region having permeability in a workpiece with the convergence light point thereof adjusted to the inside from the rear face side of a wafer, continuously forming a degenerated layer along a street in the inside of the wafer, and applying external force along the street at which the strength is deteriorated by the formation of the degenerated layer to divide the wafer along the street (refer, for example, to Japanese Patent No. 3,408,805).

In the above-described formation method of irradiating a pulse laser beam from the rear face of a semiconductor wafer to form a via hole, the irradiation of the pulse laser beam must be stopped appropriately so that a bonding pad formed on the surface of the semiconductor wafer may not be perforated. To this end, it is necessary to irradiate a predetermined number of pulses of the pulse laser beam corresponding to the thickness of the semiconductor wafer. However, the thickness of the semiconductor wafer has a dispersion, and therefore, it is significant to confirm the thickness of the semiconductor wafer at which each bonding pad is positioned.

Further, in the laser machining method wherein a pulse laser beam of a wavelength having permeability in a wafer is used and irradiated with the convergence light point thereof adjusted to the inside of a region to be divided thereby to form a degenerated layer along a street in the inside of the semiconductor wafer as described above, it is desirable to form the degenerated layer uniformly at a predetermined depth in the inside of the semiconductor or the like. However, if the semiconductor wafer has undulation and has a dispersion in thickness, then when a laser beam is irradiated, a degenerated layer cannot be formed uniformly at a predetermined depth from a relationship of the refractive index. Accordingly, in order to form a degenerated layer uniformly at a predetermined depth in the inside of a semiconductor layer, it is necessary to detect unevenness of a region in which a laser beam is to be irradiated in advance and cause laser beam irradiation means to follow up the unevenness to machine the semiconductor wafer.

SUMMARY OF THE INVENTION

Therefore, it is an object of the present invention to provide a measuring instrument for a wafer which can reliably measure the thickness or the height of an upper face of a wafer such as a semiconductor wafer held on a chuck table equipped on a processing machine for a wafer and a laser processing machine which includes the measuring instrument for a wafer.

In accordance with an aspect of the present invention, there is provided a measuring instrument for a wafer for measuring the thickness of a wafer held on a chuck table, including a laser beam oscillator for irradiating a laser beam having wavelengths which pass through and are reflected by a wafer, a condenser for condensing the laser beam oscillated from the laser beam oscillator and irradiating the laser beam on a wafer held on the chuck table, light reception means for receiving reflected light of the laser beam irradiated upon the wafer held on the chuck table, convergence light point changing means for changing the convergence light point of the laser beam condensed by the condenser, and control means for measuring the thickness of the wafer based on a change signal from the convergence light point changing means and a light reception signal from the light reception means, the convergence light point changing means including optical path length changing mirror means which in turn includes a pair of mirrors disposed such that reflecting faces thereof are opposed in a spaced relationship by a predetermined distance and extend in parallel to each other, an angle adjustment actuator for adjusting the installation angle of the mirrors, and an installation angle detection sensor for detecting the installation angle of the mirrors and outputting a detection signal to the control means, the control means including a memory for storing a thickness control map which defines a relationship between the difference of the two installation angles of the mirrors and the thickness of the wafer, the control means being operable to control the angle adjustment actuator to change the installation angle of the mirrors and detect two peaks of a light amount based on the reception signal from the light reception means, determine the difference between the two installation angles of the mirrors based on the detection signal from the installation angle detection sensor when the two peaks of the light amount are inputted and compare the installation angle difference with the thickness control map to determine the thickness of the wafer.

In accordance with another aspect of the present invention, there is provided a laser processing machine including a chuck table for holding a wafer, laser beam irradiation means for irradiating a machining laser beam on the wafer held on the chuck table, and the measuring instrument for a wafer described above, the measuring instrument measuring the thickness of the wafer held on the chuck table.

In accordance with a further aspect of the present invention, there is provided a measuring instrument for a wafer for measuring the height of an upper face of a wafer held on a chuck table, including a laser beam oscillator for irradiating a laser beam, a condenser for condensing the laser beam oscillated from the laser beam oscillator and irradiating the laser beam on a wafer held on the chuck table, light reception means for receiving reflected light of the laser beam irradiated upon the wafer held on the chuck table, convergence light point changing means for changing the convergence light point of the laser beam condensed by the condenser, and control means for measuring the thickness of the wafer based on a change signal from the convergence light point changing means and a light reception signal from the light reception means, the convergence light point changing means including optical path length changing mirror means which in turn includes a pair of mirrors disposed such that reflecting faces thereof are opposed in a spaced relationship by a predetermined distance and extend in parallel to each other, an angle adjustment actuator for adjusting the installation angle of the mirrors, and an installation angle detection sensor for detecting the installation angle of the mirrors and outputting a detection signal to the control means, the control means including a memory for storing a height control map which defines a relationship between the installation angle of the mirrors and the height of an upper face of a wafer held on the chuck table, the control means being operable to control the angle adjustment actuator to change the installation angle of the mirrors and detect a peak of a light amount based on the reception signal from the light reception means, determine two installation angles of the mirrors based on the detection signal from the installation angle detection sensor when the peak of the light amount is inputted and compare the installation angles with the height control map to determine the height of the upper face of the wafer.

In accordance with a still further aspect of the present invention, there is provided a laser processing machine including a chuck table for holding a wafer, laser beam irradiation means for irradiating a laser beam on the wafer held on the chuck table, and the measuring instrument for a wafer described above, the measuring instrument measuring the height of the upper face of the wafer held on the chuck table.

Preferably, the convergence light point changing means includes a non-parallel rays production lens for converting the laser beam to be introduced to the optical path length changing mirror means into a non-parallel rays, and a total reflection mirror for totally reflecting the non-parallel rays having passed through the optical path length changing mirror means perpendicularly toward the optical path length changing mirror means. The light reception means may include a mask having a pin hole of a diameter through which part of the reflected light passes, and a photodetector for receiving the reflected light having passed through the mask. Preferably, the laser beam oscillated from the laser beam oscillator is a continuous wave laser beam.

In the present invention, since the installation angle of the pair of mirrors of the optical path length changing mirror means which is a component of the convergence light point changing means is changed to change the convergence light point position of the laser beam irradiated upon the wafer and the installation angle of the mirrors is determined based on two peaks of the light amount of the reflected light when the convergence light point is positioned on the upper face and the lower face of the wafer and then the installation angle is compared with the thickness control map to determine the thickness of the wafer, the thickness of the wafer at the portion to be machined can be detected accurately. Accordingly, appropriate machining in accordance with the thickness can be carried out for the portion of the wafer to be machined.

The above and other objects, features and advantages of the present invention and the manner of realizing them will become more apparent, and the invention itself will best be understood, from a study of the following description and appended claims with reference to the attached drawings showing some preferred embodiments of the invention.

DETAILED DESCRIPTION OF THE PREFERRED EMBODIMENTS

Figure 1:
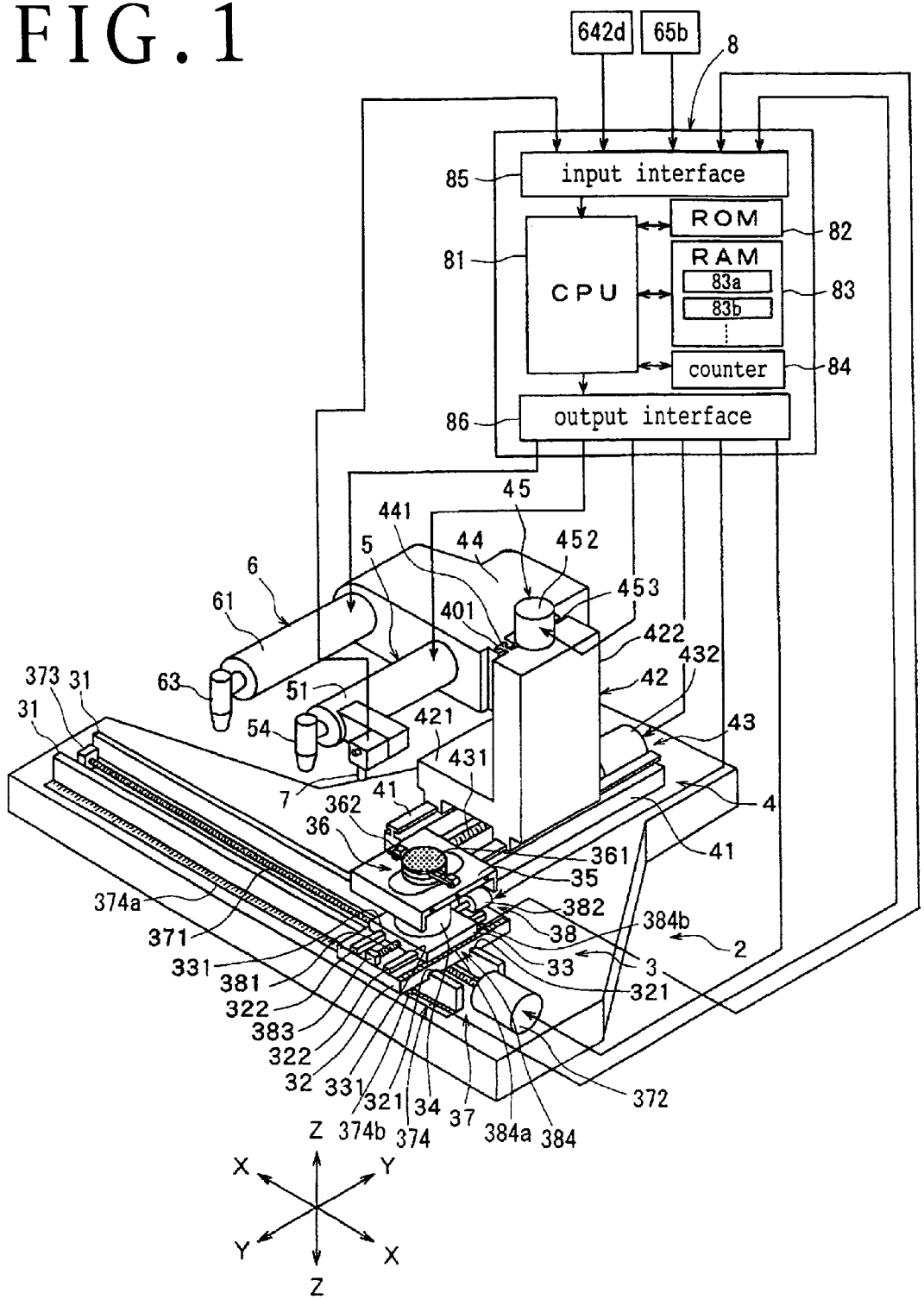
FIG. 1 is a perspective view of a laser beam machine configured in accordance with the present invention.

In the following, a measuring instrument and a laser beam machine or laser processing machine for a wafer according to the preferred embodiments of the present invention are described in detail with reference to the accompanying drawings. FIG. 1 shows a perspective view of a laser beam machine configured in accordance with the present invention. Referring to FIG. 1, the laser beam machine shown includes a stationary base 2, a chuck table mechanism 3 disposed for movement in a workpiece feeding direction (X-axis direction) indicated by an arrow mark X for holding a workpiece thereon, a laser beam irradiation unit supporting mechanism 4 disposed for movement in an indexing direction (Y-axis direction) indicated by an arrow mark Y and perpendicular to the workpiece feeding direction (X-axis direction) indicated by the arrow mark X on the stationary base 2, a machining laser beam irradiation unit 5 disposed for movement in a direction (Z-axis direction) indicated by an arrow mark Z on the laser beam irradiation unit supporting mechanism 4, and a measuring laser beam irradiation unit 6 which forms a measuring instrument for a wafer. The machining laser beam irradiation unit 5 and the measuring laser beam irradiation unit 6 are mounted on a common unit holder 44.

The chuck table mechanism 3 includes a pair of guide rails 31 disposed in parallel to each other along the workpiece feeding direction (X-axis direction) indicated by the arrow mark X on the stationary base 2, a first slide block 32 disposed for movement in the workpiece feeding direction (X-axis direction) indicated by the arrow mark X on the guide rails 31, a second slide block 33 disposed for movement in the indexing direction (Y-axis direction) indicated by the arrow mark Y on the first slide block 32, a cover table 35 supported on the second slide block 33 through a cylindrical member 34, and a chuck table 36 serving as workpiece holding means. The chuck table 36 includes a suction chuck 361 formed from a porous material and holds a semiconductor wafer as a workpiece on the suction chuck 361 (holding face) by suction means not shown. The chuck table 36 configured in this manner is rotated by a step motor not shown disposed in the cylindrical member 34. It is to be noted that a clamp 362 for securing an annular frame hereinafter described is disposed on the chuck table 36.

The first slide block 32 has a pair of guided grooves 321 provided on a lower face thereof for fitting with the guide rails 31 and has a pair of guide rails 322 provided on an upper face thereof such that they extend in parallel to each other along the indexing direction (Y-axis direction) indicated by the arrow mark Y. The first slide block 32 configured in this manner is configured for movement in the workpiece feeding direction (X-axis direction) indicated by the arrow mark X along the guide rails 31 with the guided grooves 321 fitted with the guide rails 31. The chuck table mechanism 3 in the embodiment shown includes machining feeding means 37 for moving the first slide block 32 in the workpiece feeding direction (X-axis direction) indicated by the arrow mark X along the guide rails 31.

The machining feeding means 37 includes a male thread rod 371 disposed in parallel to and between the guide rails 31, and a driving source such as a step motor 372 for driving the male thread rod 371 to rotate. The male thread rod 371 is supported at one end thereof for rotation on a bearing block 373 secured to the stationary base 2, and is connected at the other end thereof for power transmission to an output power shaft of the step motor 372. It is to be noted that the male thread rod 371 is screwed in a through female threaded hole formed in a female thread block not shown provided in a projecting manner on a lower face of a central portion of the first slide block 32. Accordingly, when the male thread rod 371 is driven to rotate forwardly or reversely by the step motor 372, the first slide block 32 is moved in the workpiece feeding direction (X-axis direction) indicated by the arrow mark X along the guide rails 31.

The laser beam machine according to the embodiment described above includes a machining feed amount detection means 374 for detecting the machining feed amount of the chuck table 36. The machining feed amount detection means 374 includes a linear scale 374a disposed along the guide rails 31, and a reading head 374b disposed on the first slide block 32 for movement along the linear scale 374a together with the first slide block 32. The reading head 374b of the machining feed amount detection means 374 in the embodiment shown sends a pulse signal of one pulse for every one μm to control means hereinafter described. Then, the control means hereinafter described counts the pulse signal inputted thereto to detect the machining feed amount of the chuck table 36.

It is to be noted that, where the step motor 372 is used as the driving source for the machining feeding means 37, it is possible to count the drive pulse of the control means hereinafter described, which outputs a driving signal to the step motor 372, to detect the machining feed amount of the chuck table 36. On the other hand, where a servomotor is used as the driving source for the machining feeding means 37, also it is possible to send a pulse signal outputted from a rotary encoder for detecting the speed of rotation of the servomotor to the control means hereinafter described so that the control means counts the pulse signal inputted thereto to detect the machining feed amount of the chuck table 36.

The second slide block 33 has a pair of guided grooves 331 provided on a lower face thereof for fitting with the guide rails 322 provided on the upper face of the first slide block 32 such that it can move in the indexing direction (Y-axis direction) indicated by the arrow mark Y through fitting engagement between the guided grooves 331 and the guide rails 322. The chuck table mechanism 3 in the embodiment shown includes first indexing feeding means 38 for moving the second slide block 33 in the indexing direction (Y-axis direction) indicated by the arrow mark Y along the guide rails 322 provided on the first slide block 32.

The first indexing feeding means 38 includes a male thread rod 381 disposed in parallel to and between the guide rails 322, and a driving source such as a step motor 382 for driving the male thread rod 381 to rotate. The male thread rod 381 is supported at one end thereof for rotation on a bearing block 383 secured to an upper face of the first slide block 32 and connected for power transmission at the other end thereof to an output power shaft of the step motor 382. It is to be noted that the male thread rod 381 is screwed in a through female threaded hole formed in a female screw block not shown provided in a projecting manner on a lower face of a central portion of the second slide block 33. Accordingly, if the male thread rod 381 is driven to rotate forwardly and reversely by the step motor 382, the second slide block 33 is moved in the indexing direction (Y-axis direction) indicated by the arrow mark Y along the guide rails 322.

The laser beam machine according to the embodiment shown includes indexing feed amount detection means 384 for detecting the index machining feed amount of the second slide block 33. The indexing feed amount detection means 384 includes a linear scale 384a disposed along the guide rails 322, and a reading head 384b disposed on the second slide block 33 for movement along the linear scale 384a together with the second slide block 33. The reading head 384b of the indexing feed amount detection means 384 sends, in the embodiment shown, a pulse signal of one pulse for each one μm to the control means hereinafter described. Then, the control means hereinafter described counts the pulse signal inputted thereto to detect the indexing feed amount of the chuck table 36.

It is to be noted that, where the step motor 382 is used as the driving source for the index feeding means 38, it is possible to count the drive pulse of the control means hereinafter described, which outputs a driving signal to the step motor 382, to detect the indexing feed amount of the chuck table 36. On the other hand, where a servomotor is used as the driving source for the first indexing feeding means 38, also it is possible to send a pulse signal outputted from a rotary encoder for detecting the speed of rotation of the servomotor to the control means hereinafter described so that the control means counts the pulse signal inputted thereto to detect the indexing feed amount of the chuck table 36.

The laser beam irradiation unit supporting mechanism 4 includes a pair of guide rails 41 disposed in parallel to each other along the index feeding direction (Y-axis direction) indicated by the arrow mark Y on the stationary base 2, and a movable support base 42 disposed for movement in the direction indicated by the arrow mark Y on the guide rails 41. The movable support base 42 includes a movable support portion 421 disposed for movement on the guide rails 41, and a mounting portion 422 attached to the movable support portion 421. The mounting portion 422 includes a pair of guide rails 423 provided on one side face thereof and extending in parallel to each other in the direction indicated by the arrow mark Z (Z-axis direction). The laser beam irradiation unit supporting mechanism 4 in the embodiment shown includes second indexing feeding means 43 for moving the movable support base 42 in the index feeding direction (Y-axis direction) indicated by the arrow mark Y along the guide rails 41.

The second indexing feeding means 43 includes a male thread rod 431 disposed in parallel to and between the guide rails 41, and a driving source such as a step motor 432 for driving the male thread rod 431 to rotate. The male thread rod 431 is supported at one end thereof for rotation on a bearing block not shown secured to the stationary base 2 and connected at the other end thereof for power transmission to an output power shaft of the step motor 432. It is to be noted that the male thread rod 431 is screwed in a female threaded hole formed in a female screw block not shown provided in a projecting manner on a lower face of a central portion of the movable support portion 421 which is a component of the movable support base 42. Therefore, if the male thread rod 431 is driven to rotate forwardly and backwardly by the step motor 432, then the movable support base 42 is moved in the index feeding direction (Y-axis direction) indicated by the arrow mark Y along the guide rails 41.

The common unit holder 44 on which the machining laser beam irradiation unit 5 and the measuring laser beam irradiation unit 6 are mounted has a pair of guided grooves 441 provided thereon for fitting for sliding movement with the guide rails 423 provided on the mounting portion 422 of the movable support base 42, and is supported for movement in the direction indicated by the arrow mark Z (Z-axis direction) through fitting engagement between the guided grooves 441 and the guide rails 423.

The laser beam machine according to the embodiment shown includes moving means 53 for moving the unit holder 44 in the direction indicated by the arrow mark Z (Z-axis direction) along the guide rails 423. The moving means includes a male thread rod (not shown) disposed between the guide rails 423, and a driving source such as a step motor 442 for driving the male thread rod to rotate. When the male thread rod not shown is driven to rotate forwardly and reversely by the step motor 442, the unit holder 44 on which the machining laser beam irradiation unit 5 and the measuring laser beam irradiation unit 6 are mounted is moved in the direction indicated by the arrow mark Z (Z-axis direction) along the guide rails 423. It is to be noted that, in the present embodiment, the step motor 432 is driven to rotate forwardly to move the machining laser beam irradiation unit 5 and the measuring laser beam irradiation unit 6 upwardly, but the step motor 432 is driven to rotate reversely to move the machining laser beam irradiation unit 5 and the measuring laser beam irradiation unit 6 downwardly.

Figure 2:
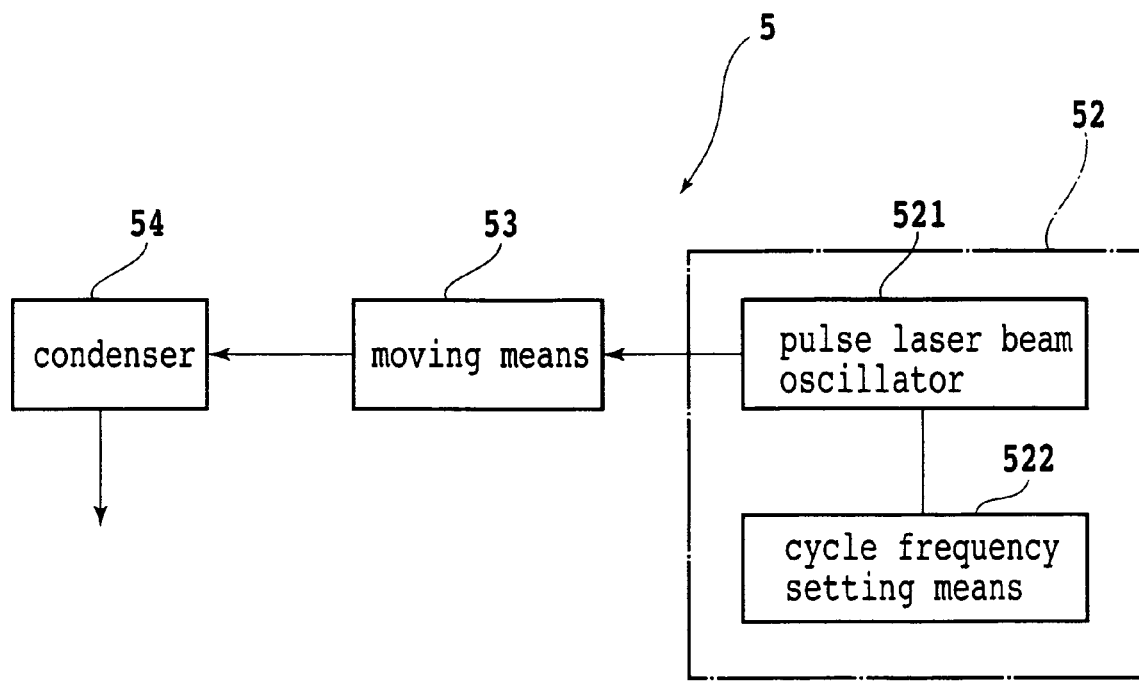
FIG. 2 is a block diagram of a machining laser beam irradiation unit equipped in the laser beam machine shown in FIG. 1.

The machining laser beam irradiation unit 5 in the embodiment shown includes a casing 51 of a cylindrical shape secured to the unit holder 44 and extending substantially horizontally. Further, the machining laser beam irradiation unit 5 includes pulse laser beam oscillation means 52 and moving means 53 disposed in the casing 51 and a condenser 54 mounted at an end of the casing 51 as seen in FIG. 2. The pulse laser beam oscillation means 52 includes a pulse laser beam oscillator 521 formed from a YAG laser oscillator or a YVO4 laser oscillator, and cycle frequency setting means 522 provided for the pulse laser beam oscillator 521.

The casing 51 which forms the machining laser beam irradiation unit 5 has an image pickup means 7 disposed at a front end portion thereof. The image pickup means 7 includes, in addition to an ordinary image pickup device (CCD device) for picking up an image of visible rays, infrared illumination means for irradiating infrared rays on a workpiece, an optical system capable of capturing the infrared rays irradiated by the infrared irradiation means, an image pickup device (infrared CCD device) for outputting an electric signal corresponding to the infrared rays captured by the optical system, and so forth, and sends an image signal obtained by image pickup to the control means not shown.

Figure 3:
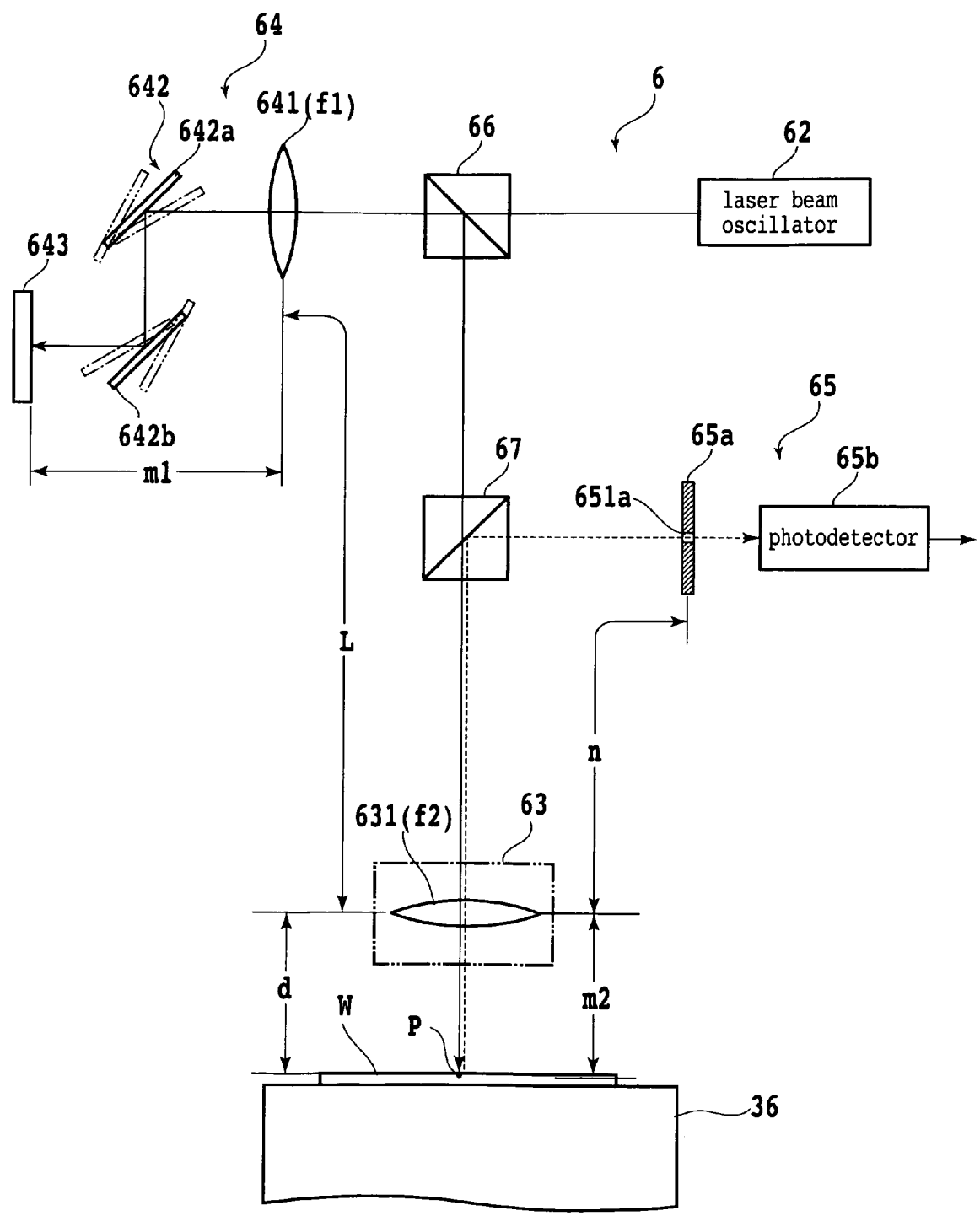
FIG. 3 is a block diagram of a measuring laser beam irradiation unit equipped in the laser beam machine shown in FIG. 1.

Now, the measuring laser beam irradiation unit 6 which composes the measuring instrument for a wafer is described with reference to FIGS. 1 and 3. The measuring laser beam irradiation unit 6 in the embodiment shown includes a casing 61 of a cylindrical shape secured to the unit holder 44 and extending substantially horizontally. Further, the measuring laser beam irradiation unit 6 includes, as seen in FIG. 3, a laser beam oscillator 62 disposed in the casing 61, and a condenser 63 which in turn includes a condenser lens 631 for condensing a laser beam oscillated from the laser beam oscillator 62 and irradiating the condensed laser beam upon a workpiece W held on the chuck table 36. The laser beam oscillator 62 irradiates, in the embodiment shown, a continuous wave laser beam having a wavelength of 1,064 nm which passes through and is reflected by a silicon wafer. The condenser 63 is mounted at an end of the casing 51 as seen in FIG. 1.

Referring to FIG. 3, the measuring laser beam irradiation unit 6 includes convergence light point changing means 64 for changing the convergence light point of the condenser 63 which condenses a laser beam oscillated form the laser beam oscillator 62, light reception means 65 for receiving reflected light of the laser beam irradiated upon a semiconductor wafer 10 held on the chuck table 36, a first half mirror 66 disposed between the laser beam oscillator 62 and the convergence light point changing means 64, and a second half mirror 67 for introducing part of the laser beam to be introduced to the condenser 63 through the first half mirror 66 to the light reception means 65. The laser beam oscillator 62 oscillates a continuous wave laser beam of a wavelength of 1,064 nm and an output power of, for example, 10 mW. The convergence light point changing means 64 in the present embodiment includes a non-parallel conversion lens 641 formed from a convex lens for converting a laser beam oscillated from the laser beam oscillator 62 and introduced through the first half mirror 66 into a non-parallel rays, an optical path length changing mirror means 642 for changing the optical path length from the laser beam oscillator 62 to the condenser 63, and a total reflection mirror 643 for totally reflecting the non-parallel rays introduced thereto through the optical path length changing mirror means 642 toward the optical path length changing mirror means 642.

Figure 4:
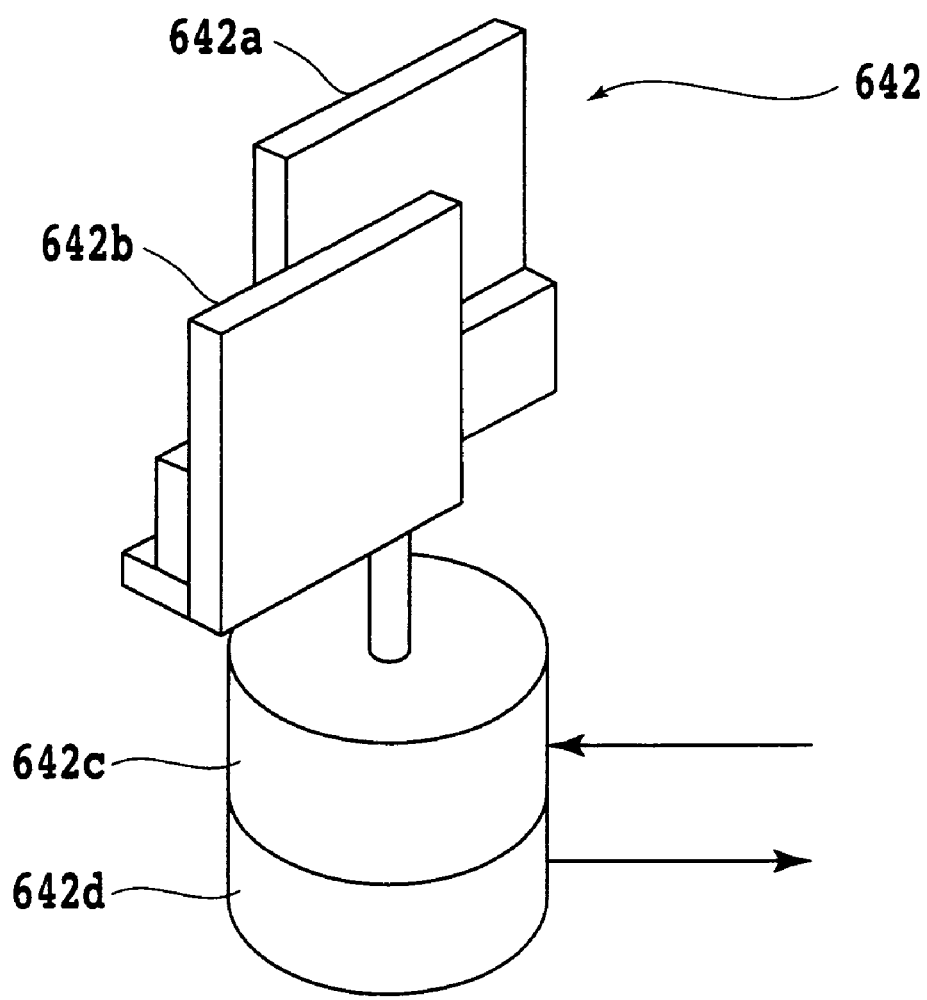
FIG. 4 is a perspective view of optical path length changing mirror means which is a component of the measuring laser beam irradiation unit shown in FIG. 3.

The optical path length changing mirror means 642 includes, as seen in FIG. 4, a pair of mirrors 642a and 642b disposed in a spaced relationship by a predetermined relationship from each other with reflecting faces thereof opposed in parallel to each other, an angle adjustment actuator 642c for adjusting the installation angle of the mirrors 642a and 642b, and an installation angle detection sensor 642d for detecting the installation angle of the mirrors 642a and 642b. As such an optical path length changing mirror means 642 as just described, it is desirable to use a galvano scanner which changes the installation angle of the mirrors 642a and 642b in an applied oscillation cycle. The installation angle detection sensor 642d includes, in the embodiment shown, a rotary encoder mounted on the angle adjustment actuator 642c and sends a detection signal to the control means hereinafter described. The optical path length changing mirror means 642 configured in this manner can change the optical path length of a laser beam by changing the installation angle of the mirrors 642a and 642b from that indicated by an alternate long and short dash line to that indicated by an alternate long and two short dashes line in FIG. 3. The light reception means 65 includes a mask 65a having a pin hole 651a of a diameter of 10 μm through which part of reflected light split by the second half mirror 67 passes, and a photodetector 65b for receiving the reflected light having passed through the mask 65a. The photodetector 65b sends a voltage signal corresponding to the received light amount to the control means hereinafter described.

Operation of the measuring laser beam irradiation unit 6 described above is described. A laser beam of a continuous wave oscillated from the laser beam oscillator 62 passes at a predetermined ratio through the first half mirror 66 as indicated by a solid line in FIG. 3 and is converted into a non-parallel rays by the non-parallel conversion lens 641. The non-parallel rays pass through the mirrors 642a and 642b of the optical path length changing mirror means 642 and then arrives at the total reflection mirror 643. The laser beam arriving at the total reflection mirror 643 is totally reflected perpendicularly by the total reflection mirror 643 and then travels reversely past the mirrors 642b and 642a of the optical path length changing mirror means 642, whereafter it passes through the non-parallel conversion lens 641 and arrives at the first half mirror 66. The laser beam arriving at the first half mirror 66 is reflected at a predetermined ratio toward the condenser 63 and then passes at a predetermined ratio through the second half mirror 67. Then, the laser beam is condensed by the condenser lens 631 and irradiated upon a workpiece W held on the chuck table 36. Reflected light of the laser beam irradiated upon the workpiece W comes to the second half mirror 67 through the condenser lens 631 as indicated by a broken line in FIG. 3 and is reflected at a predetermined ratio toward the light reception means 65 by the second half mirror 67. Reflected light of the laser beam reflected toward the light reception means 65 arrives at the photodetector 65b through the pin hole 651a of the mask 65a.

Here, the convergence light point of a laser beam oscillated from the laser beam oscillator 62 by the condenser lens 631 is described. Where the focal distance of the non-parallel conversion lens 641 is represented by f1, the focal distance of the condenser lens 631 by f2, the optical path length between the non-parallel conversion lens 641 and the condenser lens 631 by L, the optical path length from the non-parallel conversion lens 641 to the total reflection mirror 643 by m1 (which varies depending upon the optical path length changing mirror means 642), and the optical path length from the condenser lens 631 to the convergence light point P by m2, they have the following relationship in accordance the formula of the lens:

$$\text{when } m1 < f1 \text{ and } m1 > f1 \quad (1)$$

$$m2 = \cfrac{1}{\cfrac{1}{f2} - \cfrac{1}{L - \cfrac{f1(2m1-f1)}{2(m1-f1)}}}$$

$$\text{when } m1 = f1 \quad (2)$$
$$m2 = f2$$

Accordingly, by changing the installation angle of the mirrors 642a and 642b of the optical path length changing mirror means 642 to change the optical path length m1 from the non-parallel conversion lens 641 to the total reflection mirror 643, the optical path length m2 from the condenser lens 631 to the convergence light point P can be changed.

Further, where the distance from the condenser lens 631 to the upper face of the semiconductor wafer W held on the chuck table 36 is represented by d and the optical path length from the condenser lens 631 to the mask 65a by n, the mask 65a is disposed at a position which satisfies $$\frac{1}{n} + \frac{1}{d} = \frac{1}{f2}$$

Figure 5:
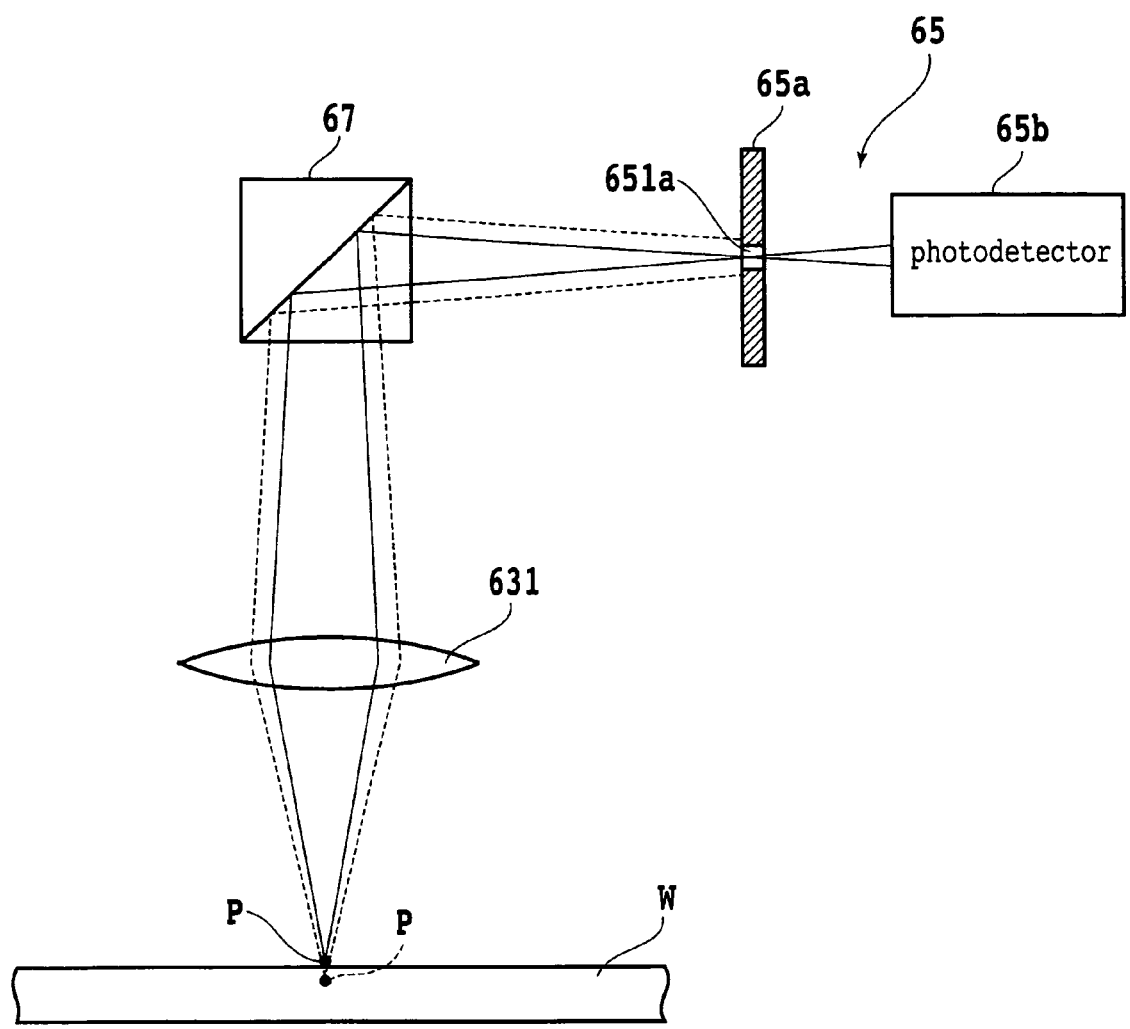
FIG. 5 is a schematic view showing light reception means in a state wherein it receives reflected light when a convergence light point of a laser beam of the measuring laser beam irradiation unit shown in FIG. 3 is positioned on an upper face of a workpiece.

Here, the position of the convergence light point P of a laser beam condensed by the condenser lens 631 and the light amount of reflected light received by the photodetector 65b are described with reference to FIGS. 5 and 6. In FIG. 5, solid lines indicate a state wherein the convergence light point P of the laser beam condensed by the condenser lens 631 is positioned on an upper face of the workpiece W. Where the convergence light point P of the laser beam is positioned on the upper face of the workpiece W in this manner, since the reflected light is condensed at the mask 65a portion, all of the reflected light passes through the pin hole 651a and is received by the photodetector 65b. Accordingly, the amount of light received by the photodetector 65b exhibits a maximum value. On the other hand, if the convergence light point P of the laser beam condensed by the condenser lens 631 is positioned between the upper face and the lower face of the workpiece W as indicated by broken lines in FIG. 5, then since the reflection area on the upper face of the workpiece W is great, the reflected light is not condensed at the mask 65a portion. Accordingly, only part of the reflected light passes through the pin hole 651a, and the amount of light received by the photodetector 65b decreases.

Figure 6:
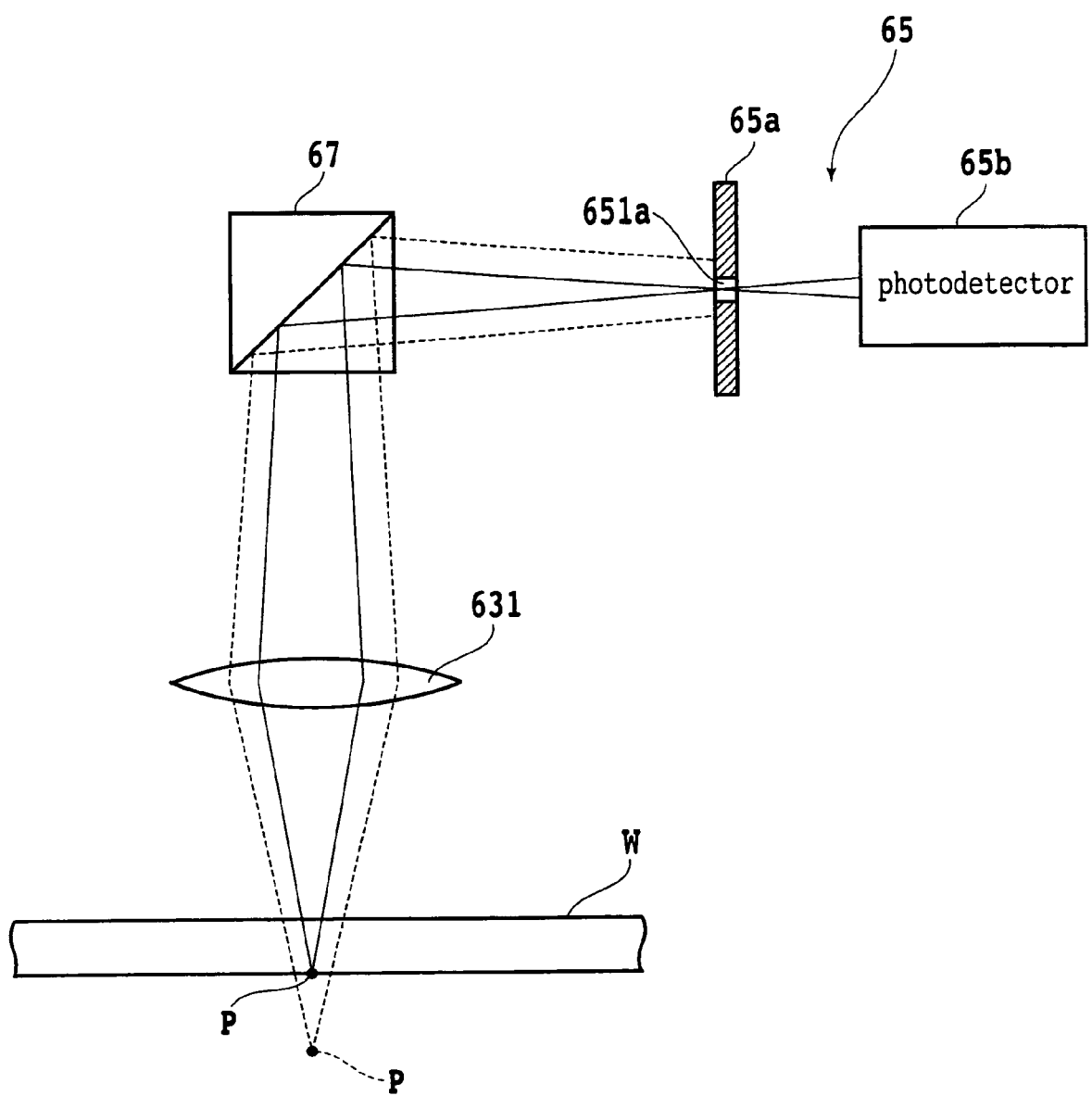
FIG. 6 is a similar view but showing the light reception means in another state wherein it receives reflected light when the convergence light point of the laser beam of the measuring laser beam irradiation unit shown in FIG. 3 is positioned on a upper face of the workpiece.

Meanwhile, in FIG. 6, solid lines indicate a state wherein the convergence light point P of the laser beam condensed by the condenser lens 631 is positioned at the lower face of the workpiece W. Where the convergence light point P of the laser beam is positioned at the lower face of the workpiece W in this manner, since the reflected light is condensed at the mask 65a portion, all of the reflected light passes through the pin hole 651a and is received by the photodetector 65b. Accordingly, the amount of light received by the photodetector 65b exhibits a maximum value. On the other hand, if the convergence light point P of the laser beam condensed by the condenser lens 631 is positioned on the lower side with respect to the lower face of the workpiece W as indicated by a broken line in FIG. 6, since the reflection area on the upper face of the workpiece W is great, the reflected light is not condensed at the mask 65a portion. Accordingly, only part of the reflected light passes through the pin hole 651a, and the amount of light received by the photodetector 65b decreases.

Figure 7:
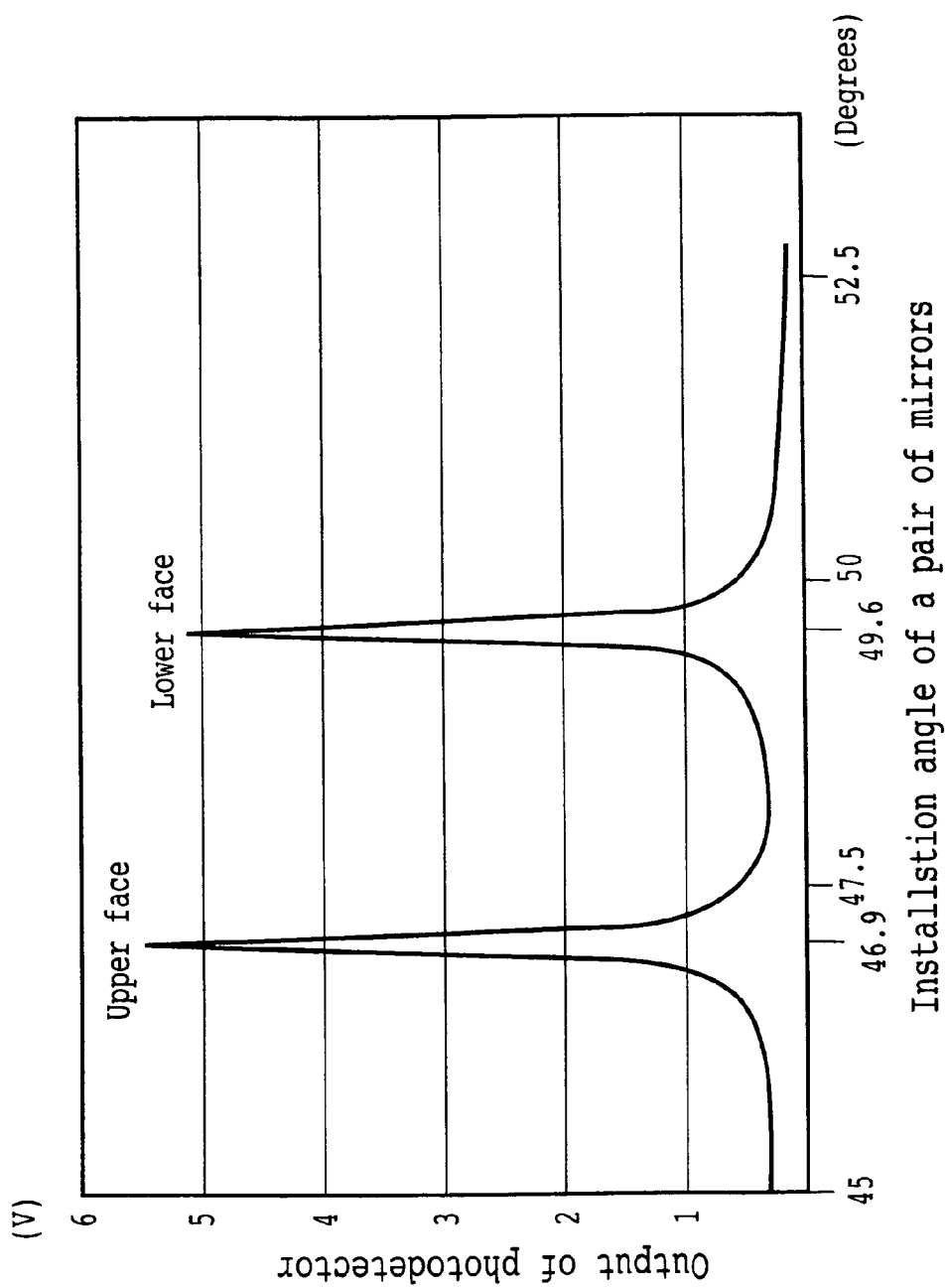
FIG. 7 is a graph illustrating a relationship between the output value of a photodetector of the light reception means which is a component of the measuring laser beam irradiation unit shown in FIG. 3 and the installation angle of the optical path length changing mirror means.

Accordingly, if the installation angle of the mirrors 642a and 642b of the optical path length changing mirror means 642 is changed to move the convergence light point P of the laser beam condensed by the condenser lens 631 from the upper side to the lower side of the workpiece W, then when the convergence light point P is positioned at the upper face and the lower face of the workpiece W, the amount of light received by the photodetector 65b exhibits a peak and outputs such a detection signal as illustrated in FIG. 7. In particular, in FIG. 7, the axis of abscissa represents the installation angle of the mirrors 642a and 642b, and the axis of ordinate represents the output voltage (V) of the photodetector 65b. Then, the control means hereinafter described which receives such a detection signal as illustrated in FIG. 7 as an input thereto determines the installation angle difference of the mirrors 642a and 642b between the two peaks when the convergence light point P is positioned at the upper face and the lower face of the workpiece W, and determines the thickness of the workpiece W based on the installation angle difference.

Figure 8:
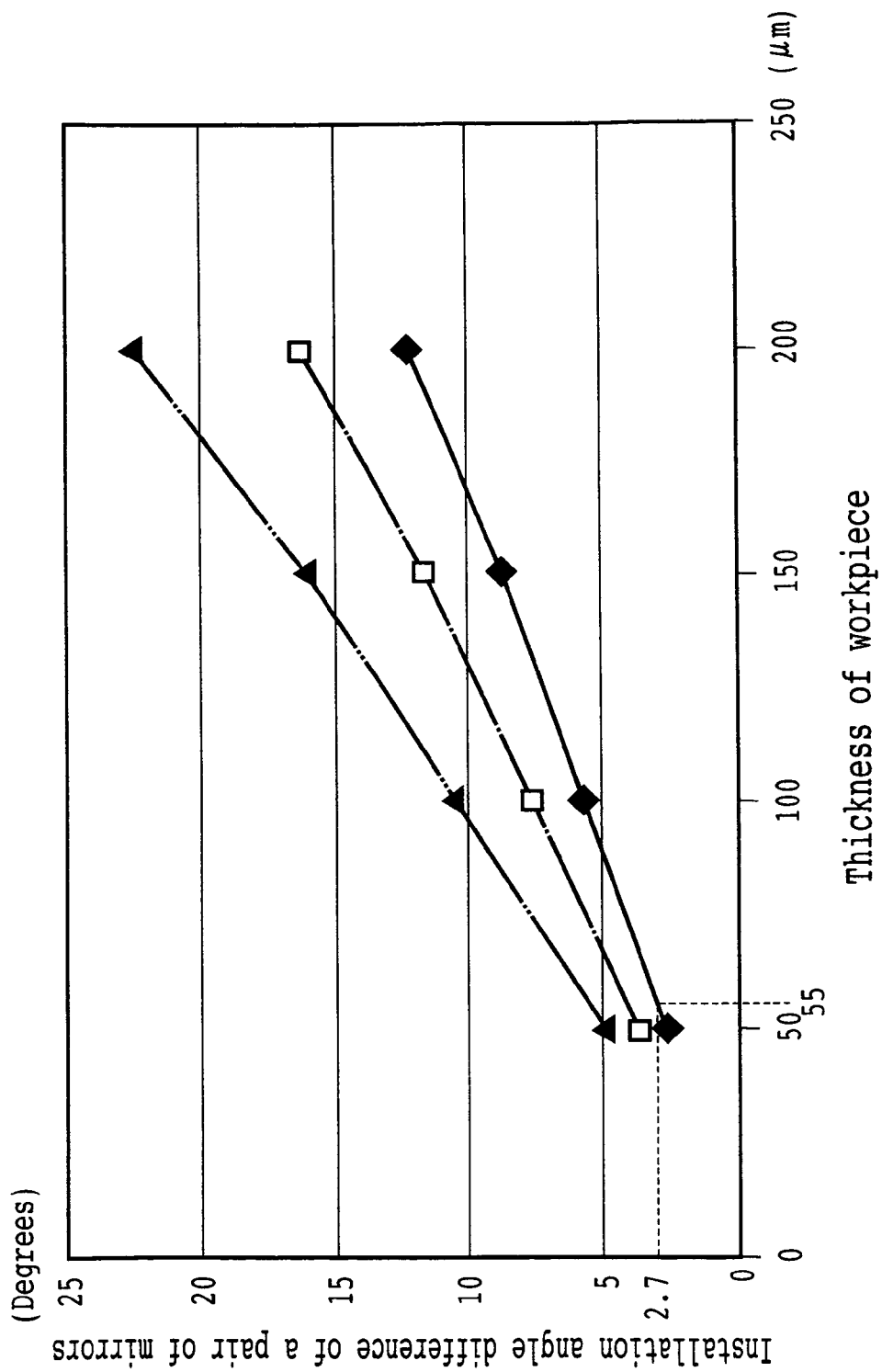
FIG. 8 is a graph illustrating a thickness control map stored in a memory of a control means equipped in the laser beam machine shown in FIG. 1.

In particular, the control means hereinafter described includes a thickness control map which defines the relationship between the installation angle difference of the mirrors 642a and 642b between the two peaks and the thickness as illustrated in FIG. 8. The control means refers to the thickness control map to determine a thickness corresponding to the installation angle distance of the mirrors 642a and 642b. FIG. 8 illustrates a relationship between the installation angle difference and the thickness determined with regard to a silicon wafer through an experiment. It is to be noted that, in the control map illustrated in FIG. 8, a solid line indicates the relationship where the NA value of the condenser lens 631 is 0.35; an alternate long and short dash line indicates the relationship where the NA value of the condenser lens 631 is 0.4; and an alternate long and two short dashes line indicates the relationship where the NA value of the condenser lens 631 is 0.45. The control map set in this manner is stored in the memory of the control means hereinafter described.

Referring back to FIG. 1, the laser beam machine according to the embodiment shown includes control means 8. The control means 8 is formed from a computer and includes a central processing unit (CPU) 81 for performing mathematic operation processing in accordance with a control program, a read only memory (ROM) 82 for storing a control program and so forth, a readable and writable random access memory (RAM) 83 for storing a mathematic operation result and so forth, a counter 84, an input interface 85 and an output interface 86. To the input interface 85 of the control means 8, detection signals from the machining feed amount detection means 374, indexing feed amount detection means 384, installation angle detection sensor 642d, photodetector 65b, image pickup means 7 and so forth are inputted. Further, the output interface 86 of the control means 8 outputs control signals to the step motor 372, step motor 382, step motor 432, step motor 452, machining laser beam irradiation unit 5, measuring laser beam irradiation unit 6 and so forth. It is to be noted that the random access memory (RAM) 83 includes a first storage area 83a for storing the control map described hereinabove with reference to FIG. 8, a second storage area 83b for storing data of design values of a workpiece hereinafter described, and other storage areas.

Figure 9:
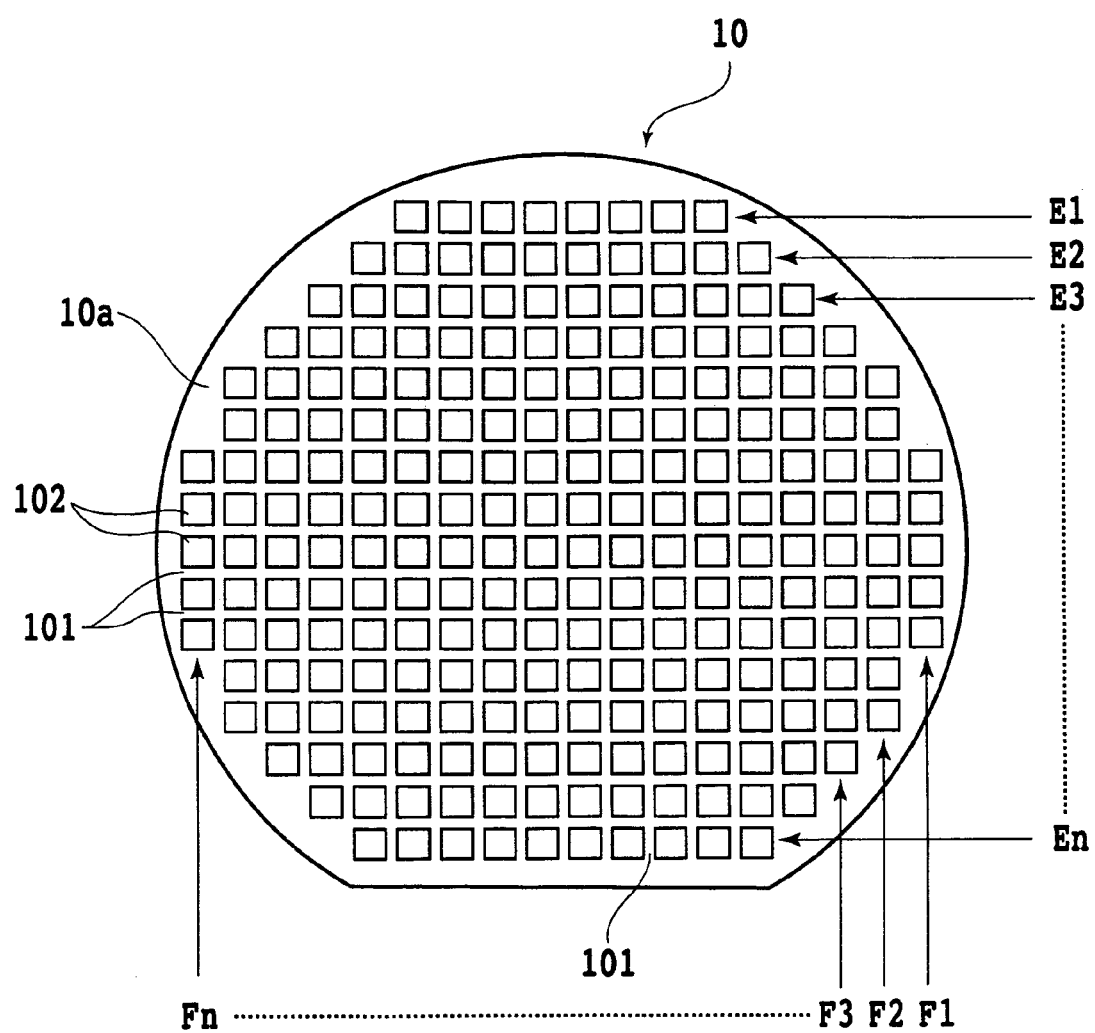
FIG. 9 is a perspective view of a semiconductor wafer as a wafer to be machined by the laser beam machine shown in FIG. 1.
Figure 10:
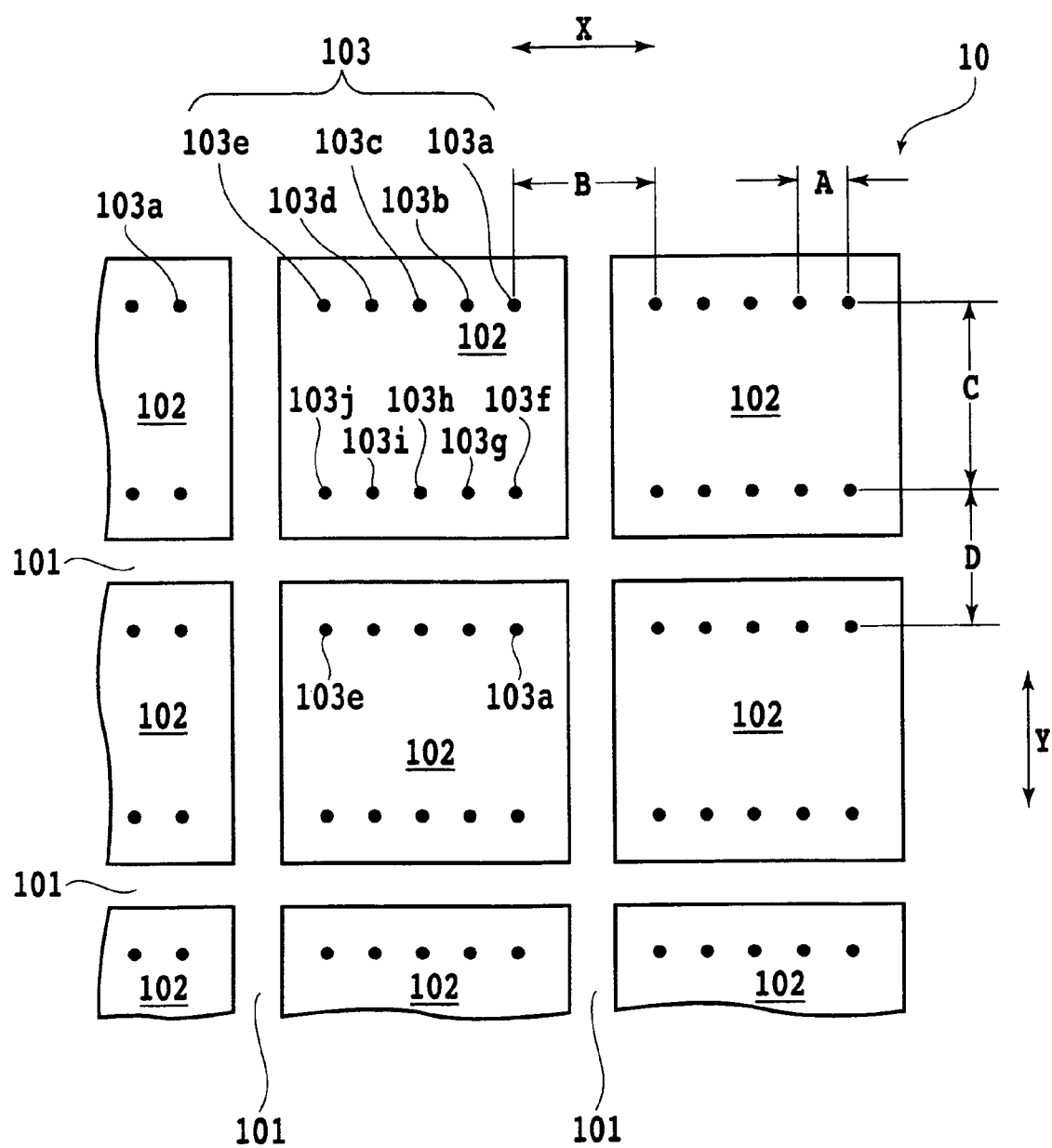
FIG. 10 is a plan view showing, in an expanded scale, part of the semiconductor wafer shown in FIG. 9.

The laser beam machine according to the embodiment shown is configured in such a manner as described hereinabove, and in the following, action of the laser beam machine is described. FIG. 9 shows a plan view of a semiconductor wafer 10 as a workpiece to be laser-worked. The semiconductor wafer 10 shown in FIG. 9 is a silicon wafer having a front face 10a on which a plurality of regions are partitioned by a plurality of streets 101 disposed like a grating, and such devices 102 as ICs or LSIs are formed in the individual partitioned regions. All of the devices 102 have the same configuration. A plurality of bonding pads 103 (103a to 103j) are formed on the surface of each device 102 as seen in FIG. 10. It is to be noted that, in the embodiment shown, the bonding pads 103a and 103f, 103b and 103g, 103c and 103h, 103d and 103i, and 103e and 103j are positioned at the same positions in the X direction. At the locations of the bonding pads 103 (103a to 103j), machined holes (via holes) which extend from the rear face 10b to the bonding pads 103 are formed.

The distance A of the bonding pads 103 (103a to 103j) of each device 102 in the X direction (leftward and rightward direction in FIG. 10) and the distance B between adjacent bonding pads in the X direction (leftward and rightward direction in FIG. 10) across a street 101 among the bonding pads 103, that is, between the bonding pad 103e and the bonding pad 103a, are set, in the embodiment shown, to an equal distance. Further, the distance C of the bonding pads 103 (103a to 103j) in each device 102 in the Y direction (upward and downward direction in FIG. 10) and the distance D between adjacent bonding pads in the Y direction (upward and downward direction in FIG. 9) across a street 101 among the bonding pads 103 formed on each device 102, that is, between the bonding pad 103f and the bonding pad 103a and between the bonding pad 103j and the bonding pad 103e, are set, in the embodiment shown, to an equal distance. Regarding the semiconductor wafer 10 configured in such a manner as described above, data of the designed values of the number of the devices 102 disposed in each row E1 to En and each column F1 to Fn shown in FIG. 9 and the distances A, B, C and D are stored in the second storage area 83b of the random access memory (RAM) 83.

Figure 11:
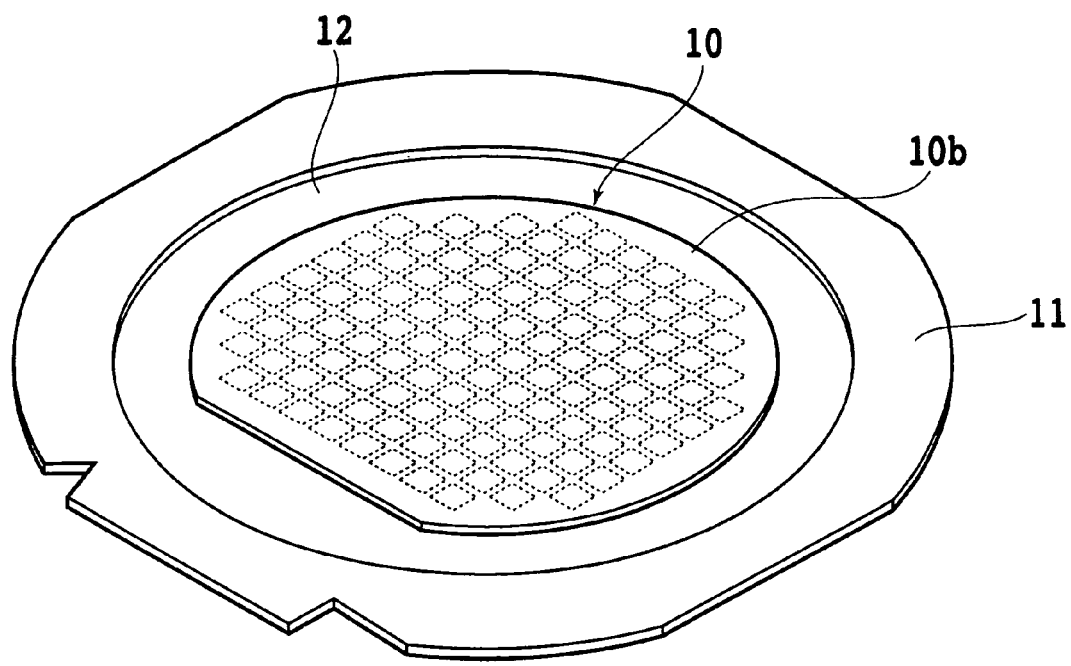
FIG. 11 is a perspective view showing the semiconductor wafer shown in FIG. 9 in a state wherein it is adhered to the surface of a protective tape mounted on an annular frame.

An embodiment of laser machining performed using the laser beam machine described hereinabove to form a machined hole (via hole) at each of the bonding pads 103 (103a to 103j) of each of the devices 102 formed on the semiconductor wafer 10 is described. The semiconductor wafer 10 configured in such a manner as described above is adhered at the front face 10a thereof to a protective tape 12 mounted on an annular frame 11 as seen in FIG. 11 and formed from a synthetic resin sheet of polyolefin or the like. Accordingly, the rear face 10b of the semiconductor wafer 10 is positioned on the upper side. The semiconductor wafer 10 supported on the annular frame 11 through the protective tape 12 in this manner is placed at the protective tape 12 side thereof on the chuck table 36 of the laser beam machine shown in FIG. 1. Then, the suction means not shown is rendered operative, whereupon the semiconductor wafer 10 is sucked to and supported on the chuck table 36 through the protective tape 12. Further, the annular frame 11 is secured by the clamp 362.

The chuck table 36 having the semiconductor wafer 10 sucked thereto and held thereon in such a manner as described above is positioned just below the image pickup means 7 by the machining feeding means 37. After the chuck table 36 is positioned just below the image pickup means 7, the semiconductor wafer 10 on the chuck table mechanism 3 is positioned at a coordinate position shown in FIG. 12. In this state, an alignment work of whether or not the streets 101 in the form of a grading formed on the semiconductor wafer 10 held on the chuck table 36 are disposed in parallel to each other in the Y axis direction and the X axis direction. In particular, an image of the semiconductor wafer 10 held on the chuck table 36 is picked up by the image pickup means 7, and an image process such as pattern matching is executed to perform an alignment work. At this time, while the front face 10a of the semiconductor wafer 10 on which the streets 101 are formed is positioned on the lower side, since the image pickup means 7 is formed from the infrared irradiation means, optical system for capturing infrared rays, image pickup device (infrared CCD device) for outputting an electric signal corresponding to the infrared rays and so forth, an image of the streets 101 can be picked up through the semiconductor wafer 10 from the rear face 10b of the semiconductor wafer 10.

Then, the chuck table 36 is moved to position the device 102 at the leftmost end in FIG. 12 in the uppermost row E1 of the device 102 formed on the semiconductor wafer 10 just below the image pickup means 7. Further, the left upper bonding pad 103a in FIG. 12 among the bonding pads 103 (103a to 103j) formed on the device 102 is positioned just below the image pickup means 7. In this state, if the image pickup means 7 detects the bonding pad 103a, then the coordinate value (al) of the bonding pad 103a is sent as a first workpiece feeding starting position coordinate value to the control means 8. Then, the control means 8 stores the coordinate value (a1) as the first workpiece feeding starting position coordinate value into the random access memory (RAM) 83.

Figure 12:
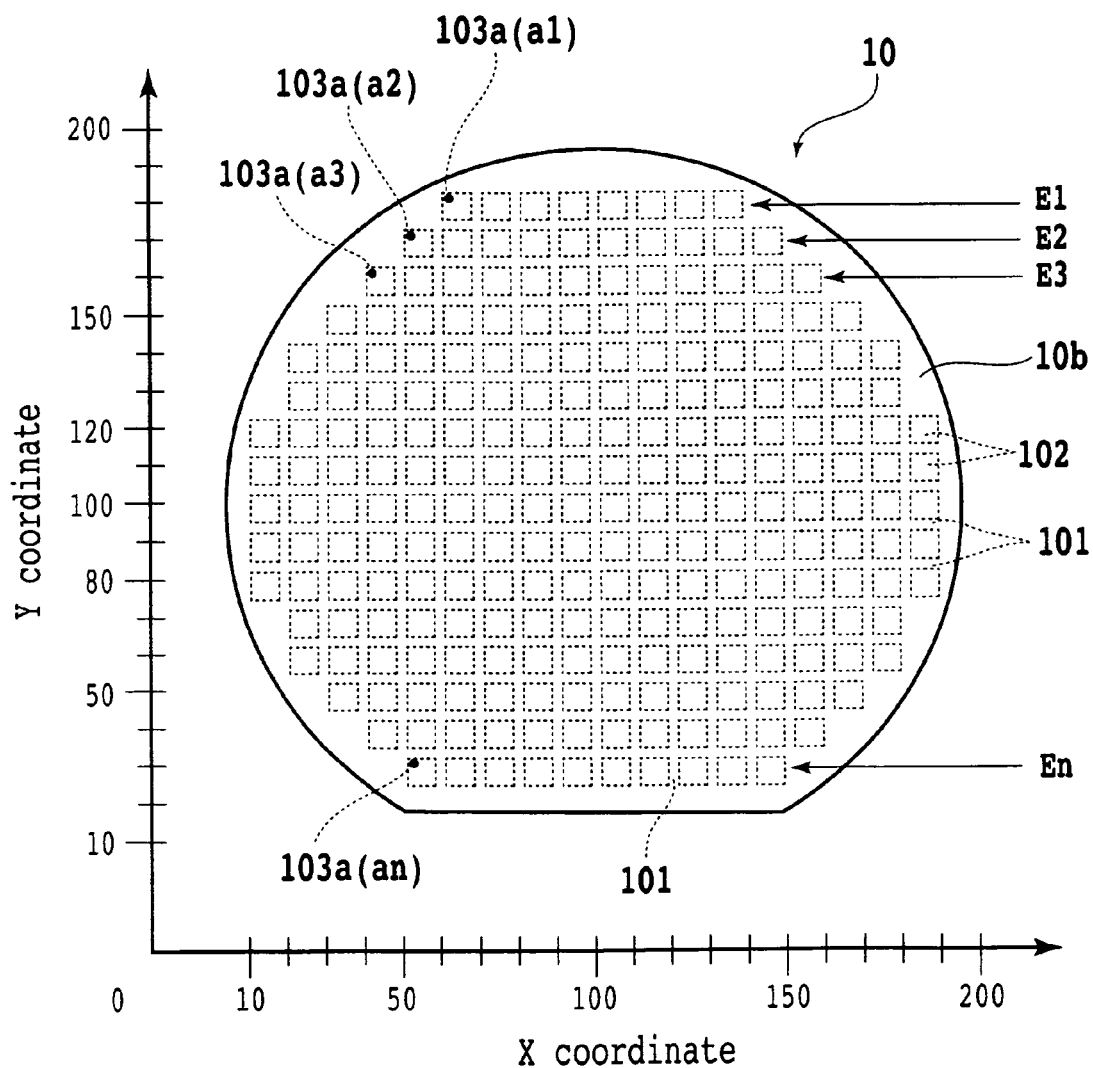
FIG. 12 is a graph illustrating a relationship between the semiconductor wafer shown in FIG. 9 and coordinate positions in a state wherein the semiconductor wafer is held at a predetermined position of a chuck table of the laser beam machine shown in FIG. 1.

After the first workpiece feeding starting position coordinate value (a1) of the device 102 in the uppermost row E1 in FIG. 12 is detected in this manner, the chuck table 36 is index-fed by a distance of the streets 101 in the Y axis direction and is moved in the X axis direction to position the leftmost device 102 on the second row E2 from above in FIG. 12 just below the image pickup means 7. Further, the left upper bonding pad 103a in FIG. 12 from among the bonding pads 103 (103a to 103j) formed on the device 102 is positioned just below the image pickup means 7. If the image pickup means 7 detects the bonding pad 103a in this state, then the coordinate value (a2) of the bonding pad 103a is sent as a second workpiece feeding starting position coordinate value to the control means 8. Then, the control means 8 stores the coordinate value (a2) as a second workpiece feeding starting position coordinate value into the random access memory (RAM) 83. Thereafter, the index feeding and workpiece feeding starting position detection step described above is repetitively executed down to the lowermost row En to detect workpiece feeding starting position coordinate values (a3 to an) of the devices 102 formed in the rows and stores the detected workpiece feeding starting position coordinate values (a3 to an) into the random access memory (RAM) 83.

Then, a thickness detection step of detecting the thickness of a portion at each bonding pad 103 (103a to 103j) formed on each device 102 of the semiconductor wafer 10 is carried out. At the thickness detection step, the machining feeding means 37 is operated first to move the chuck table 36 until the first workpiece feeding starting position coordinate value (a1) stored in the random access memory (RAM) 83 is positioned just below the condenser 63 of the measuring laser beam irradiation unit 6. Then, the control means 8 controls the measuring laser beam irradiation unit 6 in such a manner as described above to detect the thickness of the semiconductor wafer 10 and stores the detection value as the thickness of the semiconductor wafer 10 at the first workpiece feeding starting position coordinate value (a1) into the random access memory (RAM) 83.

Here, a procedure of determining the thickness of the semiconductor wafer 10 is described with reference to FIGS. 7 and 8. In particular, if the output voltage (V) of the light reception means 65 shown in FIG. 7 is inputted, then the control means 8 determines the installation angle difference of the mirrors 642a and 642b between the two peaks. In the example shown in FIG. 7, since the NA value of the condenser lens 631 is 0.35 and the installation angle of the mirrors 642a and 642b when the convergence light point P of the laser beam is positioned on the upper face of the semiconductor wafer 10 is 46.9 degrees while the installation angle of the mirrors 642a and 642b when the convergence light point P of the laser beam is positioned on the lower face of the semiconductor wafer 10 is 49.6 degrees, the installation angle difference (49.6–46.9 degrees) of the mirrors 642a and 642b between the two peaks is 2.7 degrees.

After the installation angle difference of the mirrors 642a and 642b between the two peaks is determined in this manner, the control means 8 compares the installation angler difference with the data of the thickness control map shown in FIG. 8 where the NA value of the condenser lens 631 indicated by the solid line is 0.35. In particular, since the installation angle difference of the mirrors 642a and 642b between the two peaks is 2.7 degrees, if it is compared with the data of the thickness control map shown in FIG. 8 where the NA value of the condenser lens 631 indicated by the solid line is 0.35, then the thickness of the semiconductor wafer 10 is 55 μm. After the thickness detection step of the first workpiece feeding starting position coordinate value (a1) is carried out in this manner, the control means 8 operates the machining feeding means 37 to move the chuck table 36 by the distance A to position the position corresponding to the bonding pad 103b just below the condenser 63 of the measuring laser beam irradiation unit 6. Then, the measuring laser beam irradiation unit 6 executes the thickness detection step described above and stores a detection value then into the random access memory (RAM) 83. In this manner, the thickness detection step is carried out for the positions corresponding to all of the bonding pads 103 formed on the semiconductor wafer 10, and resulting detection values are stored into the random access memory (RAM) 83.

Figure 13:
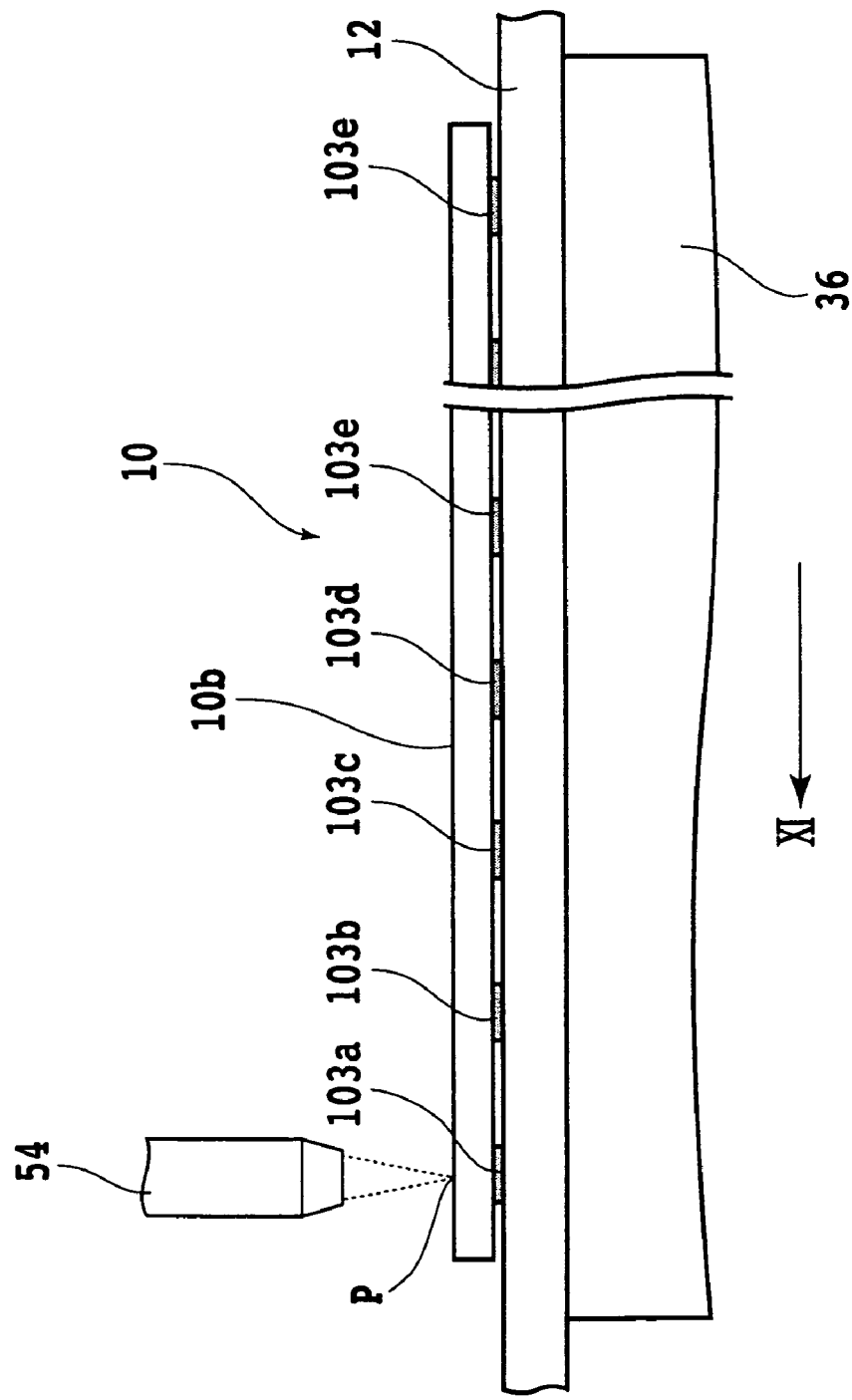
FIG. 13 is a schematic view of a perforation step of forming a laser machined hole in the semiconductor wafer shown in FIG. 9 using the laser beam machine shown in FIG. 1.

Thereafter, a perforation step of perforating a laser machined hole (via hole) at a portion at each of the bonding pads 103 (103a to 103j) formed on the devices 102 of the semiconductor wafer 10 is carried out. At the perforation step, the machining feeding means 37 is operated to move the chuck table 36 until the first workpiece feeding starting position coordinate value (a1) stored in the bonding pad 103 is positioned just below the condenser 54 of the pulse laser beam oscillation means 52 of the machining laser beam irradiation unit 5. The state wherein the first workpiece feeding starting position coordinate value (a1) is positioned just below the condenser 54 in this manner is illustrated in FIG. 13. From the state illustrated in FIG. 13, the control means 8 controls the pulse laser beam oscillation means 52 of the machining laser beam irradiation unit 5 to irradiate a machining pulse laser beam from the condenser 54.

An example of machining conditions at the perforation step is described.

Figure 14:
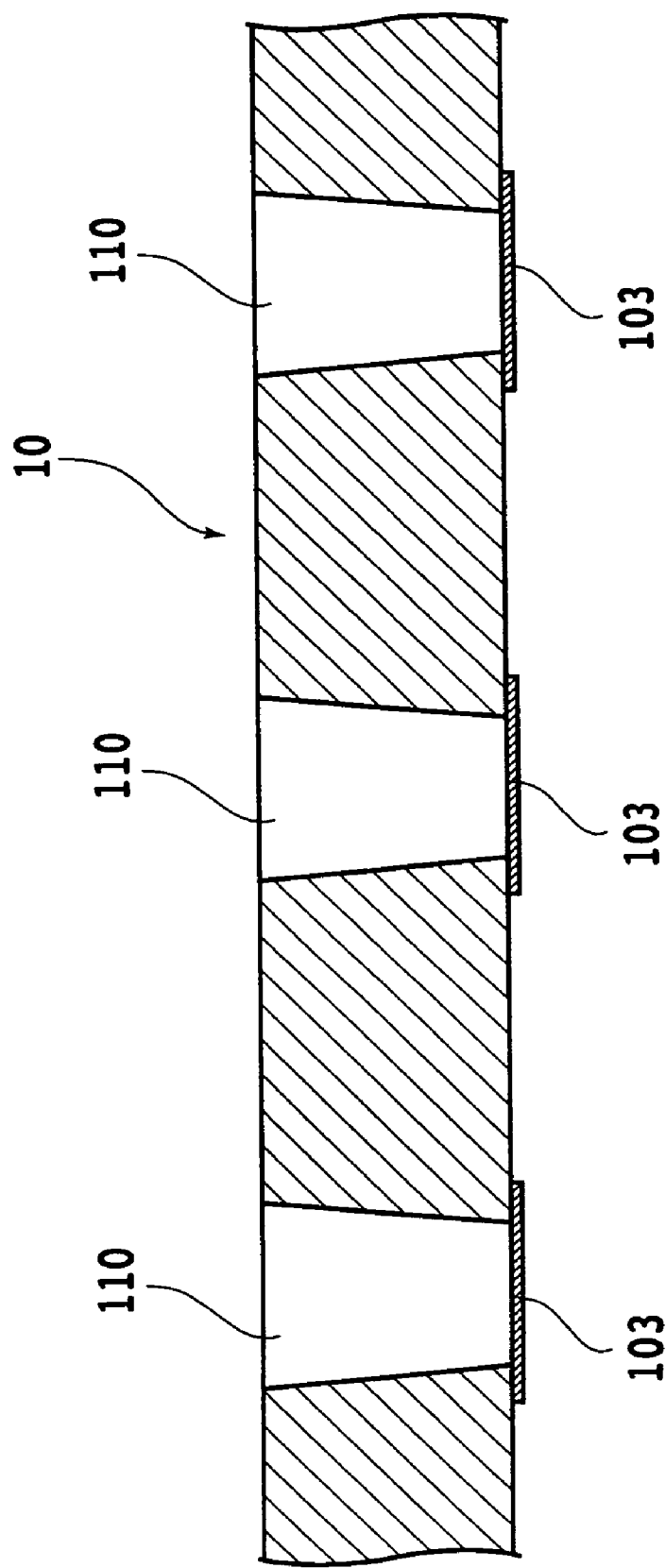
FIG. 14 is a partial enlarged view of the semiconductor wafer on which laser machined holes are formed by the perforation step illustrated in FIG. 13.

Light source: LD excitation Q switch Nd:YVO4 pulse laser
Wavelength: 355 nm
Energy density: 30 J/cm$^2$
Condensed spot diameter: $\phi$70 μm If the perforation step is carried out in accordance with such machining conditions as given above, then laser machined holes whose depth is approximately 2 μm can be formed per one pulse of the pulse laser beam in the silicon wafer. Accordingly, laser machined holes 110 which extend to the bonding pads 103 can be formed as seen in FIG. 14 by irradiating, if the thickness of the portion to be machined detected at the thickness detection step is 54 μm, the pulse laser beam by 27 pulses, but by irradiating, if the thickness of the portion to be machined is 58 μm, the pulse laser beam by 29 pulses.

After the perforation step at the first workpiece feeding starting position coordinate value (a1) is carried out in such a manner as described above, the machining feeding means 37 is operated to move the chuck table 36 by the distance A to position the position corresponding to the bonding pad 103$b$ just below the condenser 54 of the pulse laser beam oscillation means 52. Then, the perforation step is carried out in accordance with the thickness of each portion to be machined detected by the thickness detection step. By carrying out the perforation step after the positions corresponding to all of the bonding pads 103 formed on the semiconductor wafer 10 are positioned just below the condenser 54 of the pulse laser beam oscillation means 52 in this manner, the laser machined holes 110 extending from the rear face 10$b$ to the bonding pads 103 can be formed in the semiconductor wafer 10.

Figure 15:
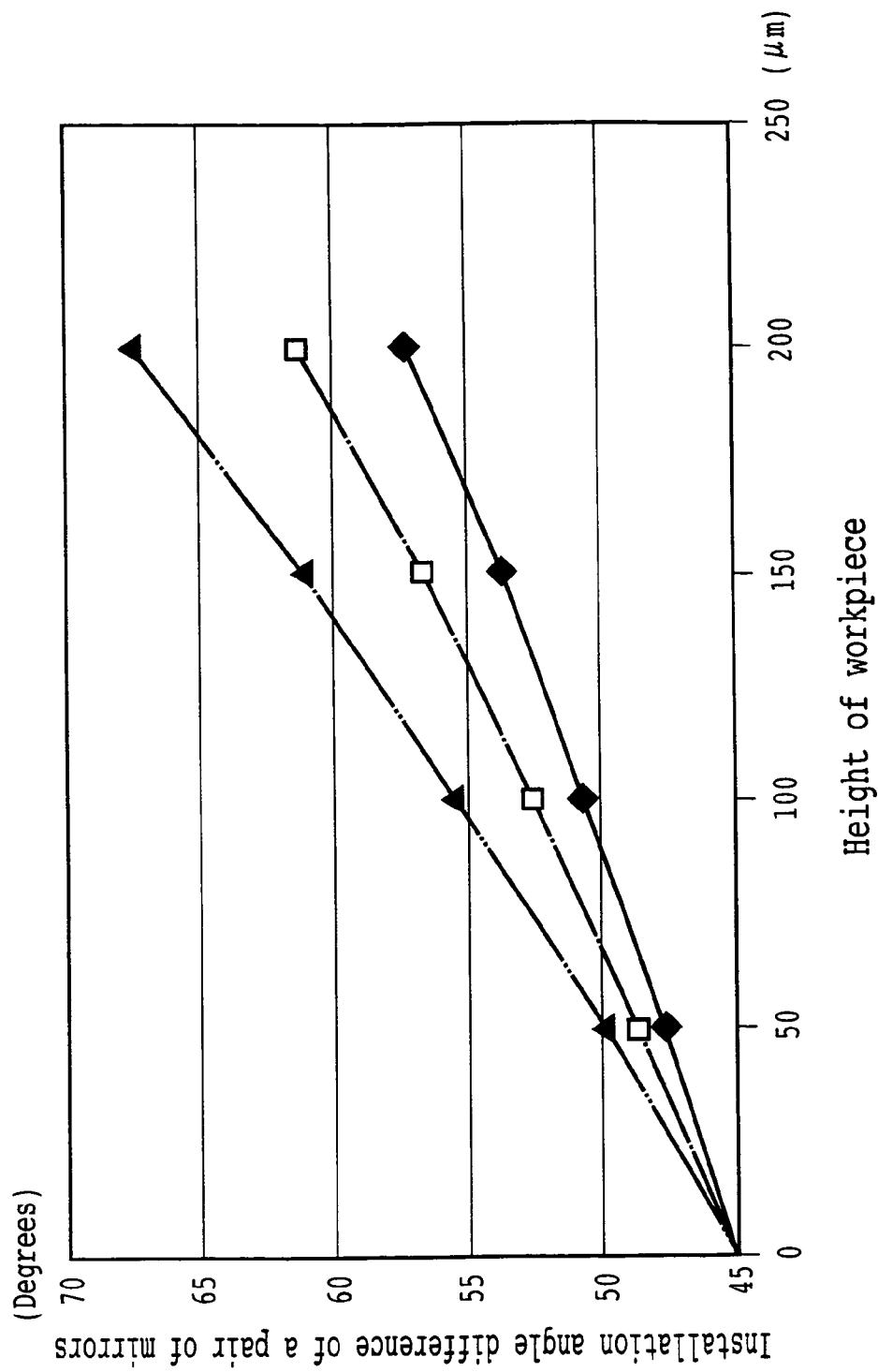
FIG. 15 is a graph illustrating a height control map stored in the memory of the control means equipped in the laser beam machine shown in FIG. 1.
Figure 16:
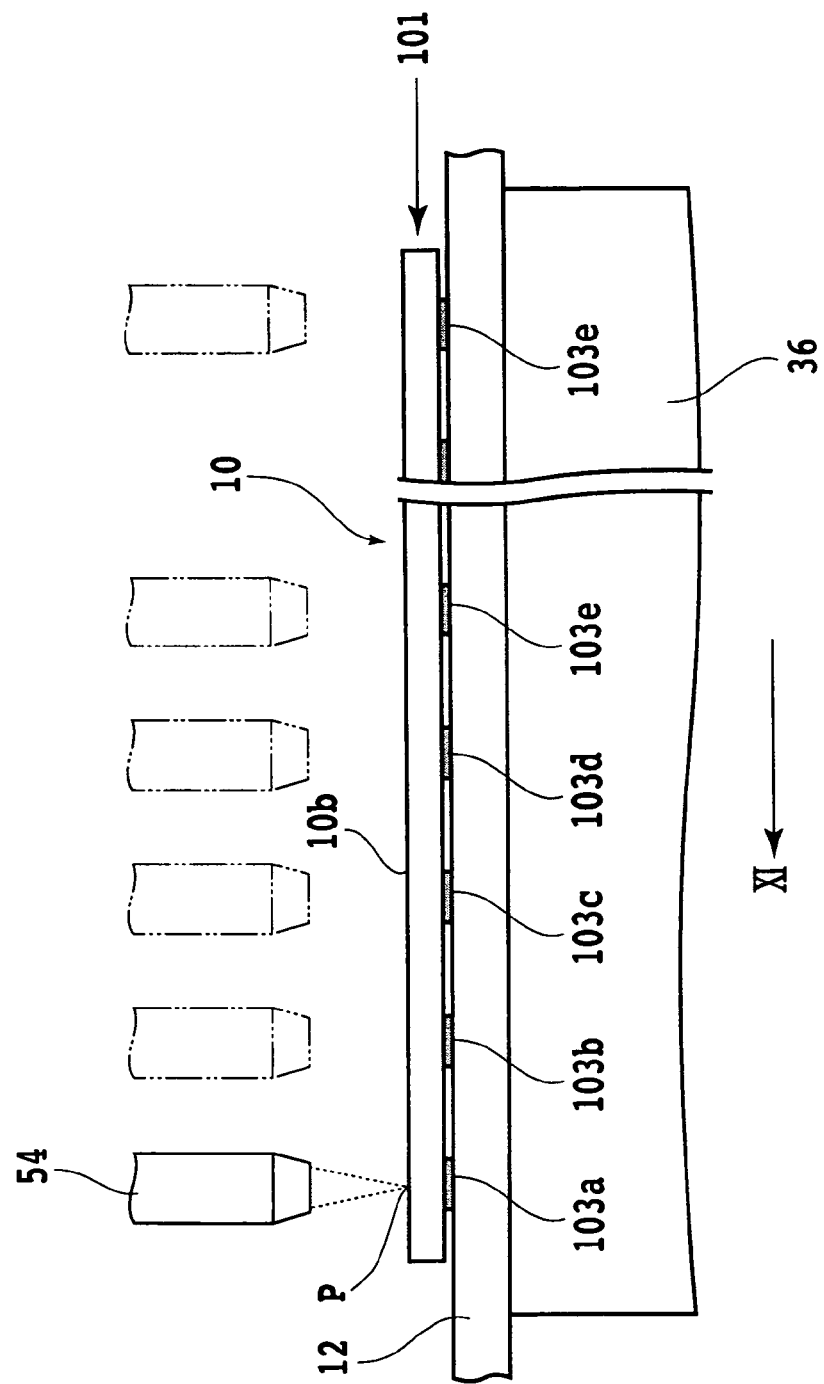
FIG. 16 is a schematic view showing the measuring laser beam irradiation unit shown in FIG. 3 in a state wherein it is used to detect the height of an upper face of a semiconductor wafer held on the chuck table.

Now, another embodiment of a measuring instrument for a wafer is described with reference to FIGS. 15 and 16. The embodiment shown in FIGS. 15 and 16 is a measuring instrument for a wafer which detects the height position of an upper face of a workpiece held on a chuck table. In the embodiment shown in FIGS. 15 and 16, while the configuration of the measuring laser beam irradiation unit is substantially same as that of the measuring laser beam irradiation unit 6 described hereinabove with reference to FIG. 3, the control map stored in the random access memory (RAM) 83 of the control means 8 is different. The control map used in the present embodiment indicates the height positions of a workpiece corresponding to the installation angles of the mirrors 642$a$ and 642$b$ as seen in FIG. 15.

The height control map illustrated in FIG. 15 indicates a result of experimental determination of the installation angle of the mirrors 642$a$ and 642$b$ when the convergence light point P is positioned on an upper face of a plurality of workpieces W which are different in thickness from each other where the workpieces W are placed on the chuck table 36 while the convergence light point P of a laser beam condensed by the condenser lens 631 of the measuring laser beam irradiation unit 6 described hereinabove with reference to FIG. 3 is set such that the convergence light point P is positioned on the holding face which is an upper face of the chuck table 36 when the installation angle of the mirrors 642$a$ and 642$b$ is 45 degrees. In the height control map shown in FIG. 15, a solid line indicates the installation angle where the NA value of the condenser lens 631 is 0.35, an alternate long and short dash line indicates the installation angle where the NA value of the condenser lens 631 is 0.4, and an alternate long and two short dashes line indicates the installation angle where the NA value of the condenser lens 631 is 0.45. It is to be noted that, in the present embodiment, the laser beam irradiated from the measuring laser beam irradiation unit 6 need not have a wavelength which passes through and is reflected by a workpiece, but may be a laser beam of a wavelength which is reflected by a workpiece.

In order to use the measuring laser beam irradiation unit 6 described hereinabove which is a measuring instrument for a wafer to detect the height position of an upper face along the streets 101 of the semiconductor wafer 10 held on the chuck table 36, the chuck table 36 is operated to position the semiconductor wafer 10 just below the condenser 63 at every predetermined distance and irradiate a laser beam from the condenser 63 while light reflected by the upper face of the semiconductor wafer 10 is received by the photodetector 65$b$ as described above. Then, the control means 8 changes the installation angle of the mirrors 642$a$ and 642$b$ to detect the installation angle of the mirrors 642$a$ and 642$b$ every time the light amount of reflected light received by the photodetector 65$b$ exhibits a peak and compare the installation angles with the height control map illustrated in FIG. 15 to determine the height position of the semiconductor wafer 10 with respect to the detected installation angle and then store the height position into the random access memory (RAM) 83. By detecting the height position at every predetermined distance along the streets 101 of the semiconductor wafer 10 in this manner, the state of the undulation along the streets 101 of the semiconductor wafer 10 can be detected. Accordingly, if the pulse laser beam oscillation means 52 of the machining laser beam irradiation unit 5 is controlled so as to control the height position of the convergence light point of the machining pulse laser beam in response to the height position of the semiconductor wafer 10 detected in such a manner as described above when the convergence light point of the machining pulse laser beam of a wavelength having a transmission property through a silicon wafer irradiated from the condenser 54 and irradiating the convergence light point along the streets 101, then a degenerated layer can be formed at a position in the inside of the semiconductor wafer 10 parallel to the upper face of the semiconductor wafer 10.

While the present invention has been described in connection with the embodiments shown in the drawings, the present invention is not restricted only to the embodiments but can be carried out in various modified forms within the spirit and scope of the present invention. For example, while, in the embodiments described above, a laser beam oscillator is equipped on each of the machining laser beam irradiation unit 5 and the measuring laser beam irradiation unit 6, the output power of a laser beam oscillated from the laser beam oscillator 62 of the machining laser beam irradiation unit 5 may be adjusted, for example, to 10 mW by means of the moving means 53 and used as a laser beam for the measuring laser beam irradiation unit 6.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A measuring instrument for a wafer for measuring the thickness of a wafer held on a chuck table, comprising:
   a laser beam oscillator for irradiating a laser beam having wavelengths which pass through and are reflected by a wafer;
   a condenser for condensing the laser beam oscillated from said laser beam oscillator and irradiating the laser beam on a wafer held on said chuck table;
   light reception means for receiving reflected light of the laser beam irradiated upon the wafer held on said chuck table;
   convergence light point changing means for changing the convergence light point of the laser beam condensed by said condenser; and
   control means for measuring the thickness of the wafer based on a change signal from said convergence light point changing means and a light reception signal from said light reception means;
   said convergence light point changing means including optical path length changing mirror means which includes a pair of mirrors disposed such that reflecting faces are opposed in a spaced relationship by a predetermined distance and extend in parallel to each other, an angle adjustment actuator for adjusting the installation angle of said mirrors, and an installation angle detection sensor for detecting the installation angle of said mirrors and outputting a detection signal to said control means;
   said control means including a memory for storing a thickness control map which defines a relationship between the difference of the two installation angles of said mirrors and the thickness of the wafer, said control means being operable to control said angle adjustment actuator to change the installation angle of said mirrors and detect two peaks of a light amount based on the reception signal from said light reception means, determine the difference between the two installation angles of said mirrors based on the detection signal from said installation angle detection sensor when the two peaks of the light amount are inputted and compare the installation angle difference with the thickness control map to determine the thickness of the wafer.

2. A measuring instrument for a wafer according to claim 1, wherein said convergence light point changing means includes a non-parallel rays production lens for converting the laser beam to be introduced to said optical path length changing mirror means into a non-parallel rays, and a total reflection mirror for totally reflecting the non-parallel rays having passed through said optical path length changing mirror means perpendicularly toward said optical path length changing mirror means.

3. A measuring instrument for a wafer according to claim 1, wherein said light reception means includes a mask having a pin hole of a diameter through which part of the reflected light passes, and a photodetector for receiving the reflected light having passed through said mask.

4. A measuring instrument for a wafer according to claim 1, wherein the laser beam oscillated from said laser beam oscillator is a continuous wave laser beam.

5. A laser processing machine, comprising:
   a chuck table for holding a wafer;
   laser beam irradiation means for irradiating a machining laser beam on the wafer held on said chuck table; and
   a measuring instrument for a wafer according to claim 1;
   said measuring instrument measuring the thickness of the wafer held on said chuck table.

6. A measuring instrument for a wafer for measuring the height of an upper face of a wafer held on a chuck table, comprising:
   a laser beam oscillator for irradiating a laser beam;
   a condenser for condensing the laser beam oscillated from said laser beam oscillator and irradiating the laser beam on a wafer held on said chuck table;
   light reception means for receiving reflected light of the laser beam irradiated upon the wafer held on said chuck table;
   convergence light point changing means for changing the convergence light point of the laser beam condensed by said condenser; and
   control means for measuring the thickness of the wafer based on a change signal from said convergence light point changing means and a light reception signal from said light reception means;
   said convergence light point changing means including optical path length changing mirror means which includes a pair of mirrors disposed such that reflecting faces are opposed in a spaced relationship by a predetermined distance and extend in parallel to each other, an angle adjustment actuator for adjusting the installation angle of said mirrors, and an installation angle detection sensor for detecting the installation angle of said mirrors and outputting a detection signal to said control means;
   said control means including a memory for storing a height control map which defines a relationship between the installation angle of said mirrors and the height of an upper face of a wafer held on said chuck table, said control means being operable to control said angle adjustment actuator to change the installation angle of said mirrors and detect a peak of a light amount based on the reception signal from said light reception means, determine two installation angles of said mirrors based on the detection signal from said installation angle detection sensor when the peak of the light amount is inputted and compare the installation angles with the height control map to determine the height of the upper face of the wafer.

7. A measuring instrument for a wafer according to claim 6, wherein said convergence light point changing means includes a non-parallel rays production lens for converting the laser beam to be introduced to said optical path length changing mirror means into a non-parallel rays, and a total reflection mirror for totally reflecting the non-parallel rays having passed through said optical path length changing mirror means perpendicularly toward said optical path length changing mirror means.

8. A measuring instrument for a wafer according to claim 6, wherein said light reception means includes a mask having a pin hole of a diameter through which part of the reflected light passes, and a photodetector for receiving the reflected light having passed through said mask.

9. A measuring instrument for a wafer according to claim 6, wherein the laser beam oscillated from said laser beam oscillator is a continuous wave laser beam.

10. A laser processing machine, comprising:
    a chuck table for holding a wafer;
    laser beam irradiation means for irradiating a laser beam on the wafer held on said chuck table; and
    a measuring instrument for a wafer according to claim 6;
    said measuring instrument measuring the height of the upper face of the wafer held on said chuck table.

* * * * *